US012556958B2

(12) United States Patent
Li

(10) Patent No.: US 12,556,958 B2
(45) Date of Patent: Feb. 17, 2026

(54) NODE B MEASUREMENT SHARING

(71) Applicant: QUALCOMM INCORPORATED, San Diego, CA (US)

(72) Inventor: Hao Li, Shanghai (CN)

(73) Assignee: QUALCOMM Incorporated, San Diego, CA (US)

(*) Notice: Subject to any disclaimer, the term of this patent is extended or adjusted under 35 U.S.C. 154(b) by 241 days.

(21) Appl. No.: 18/559,259

(22) PCT Filed: Jul. 30, 2021

(86) PCT No.: PCT/CN2021/109481
§ 371 (c)(1),
(2) Date: Nov. 6, 2023

(87) PCT Pub. No.: WO2023/004728
PCT Pub. Date: Feb. 2, 2023

(65) Prior Publication Data
US 2024/0236746 A1  Jul. 11, 2024

(51) Int. Cl.
*H04W 24/10* (2009.01)
*H04B 7/06* (2006.01)
(Continued)

(52) U.S. Cl.
CPC .......... *H04W 24/10* (2013.01); *H04B 7/0617* (2013.01); *H04B 17/336* (2015.01); *H04L 5/0051* (2013.01); *H04L 5/0053* (2013.01)

(58) Field of Classification Search
CPC ... H04W 24/10; H04B 17/336; H04B 7/0617; H04L 5/0051; H04L 5/0053
See application file for complete search history.

(56) References Cited

U.S. PATENT DOCUMENTS 10,064,130 B2   8/2018  Tambaram et al.
2015/0223213 A1  8/2015  Moon et al.
(Continued)

FOREIGN PATENT DOCUMENTS

CN    109644391 A     4/2019
WO   WO-2015180128 A1  12/2015
(Continued)

OTHER PUBLICATIONS

International Search Report and Written Opinion—PCT/CN2021/109481—ISA/EPO—Apr. 26, 2022.
(Continued)

*Primary Examiner* — Brian J. Gillis
(74) *Attorney, Agent, or Firm* — Holland & Hart LLP/Qualcomm

(57) ABSTRACT

Methods, systems, and devices for wireless communications are described. A first cell associated with a first radio access technology (RAT) may transmit a measurement sharing request to a second cell associated with a second RAT based on a resource availability of the first cell. The measurement sharing request may indicate a request for the second cell to generate one or more channel measurements for a user equipment (UE). In response to the measurement sharing request, the second cell may transmit a measurement sharing acknowledgement or a measurement sharing rejection to the first cell based on a resource availability of the second cell. If the second cell transmits a measurement sharing acknowledgement to the first cell, the second cell may generate the requested channel measurements for the UE and may transmit an indication of the requested channel measurements to the first cell.

30 Claims, 11 Drawing Sheets

(51) Int. Cl.
    *H04B 17/336*     (2015.01)
    *H04L 5/00*     (2006.01)

(56) References Cited

U.S. PATENT DOCUMENTS

2017/0094619 A1*   3/2017   Aldana ................. G01S 13/765
2022/0216906 A1*   7/2022   Liu ....................... H04B 7/024

FOREIGN PATENT DOCUMENTS

WO    WO-2018044618     3/2018
WO    WO-2020258085 A1   12/2020

OTHER PUBLICATIONS

Qualcomm Europe: "Measurements in Support of LTE-A Techniques", 3GPP TSG-RAN WG1 #56, R1-090859, Athens, Greece, Feb. 9-13, 2009, 2 Pages, Feb. 13, 2009, the whole document.

* cited by examiner

NODE B MEASUREMENT SHARING

CROSS REFERENCE

The present application is a 371 national stage filing of International PCT Application No. PCT/CN2021/109481 by Li entitled "NODE B MEASUREMENT SHARING," filed Jul. 30, 2021, which is assigned to the assignee hereof, and which is expressly incorporated by reference in its entirety herein.

FIELD OF TECHNOLOGY

The following relates to wireless communications, including Node B measurement sharing.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a base station may schedule a UE to transmit reference signals on available resources and may perform channel estimation based on measuring the reference signals transmitted by the UE. In some cases, however, the base station may have insufficient available resources for scheduling such transmissions from the UE. As a result, the base station may be unable to perform channel estimation, which may reduce the likelihood of successful communications between the base station and the UE.

SUMMARY

The described techniques relate to improved methods, systems, devices, and apparatuses that support Node B measurement sharing. Generally, the described techniques provide for improving communications between a user equipment (UE) and a first cell that is associated with a first radio access technology (RAT) based on the first cell performing a measurement sharing procedure with a second cell that is associated with a second RAT. The first cell may transmit a measurement sharing request to the second cell based on a resource availability of the first cell. The measurement sharing request may indicate a request for the second cell to generate one or more channel measurements for the UE. In response to the measurement sharing request, the second cell may transmit a measurement sharing acknowledgement or a measurement sharing rejection to the first cell based on a resource availability of the second cell. If the second cell transmits a measurement sharing acknowledgement to the first cell, the second cell may generate the requested channel measurements for the UE and may transmit an indication of the requested channel measurements to the first cell. Accordingly, the first cell may use the requested channel measurements to improve communications between the first cell and the UE.

A method for wireless communications at a first cell associated with a first RAT is described. The method may include transmitting, from the first cell and to a second cell associated with a second RAT, a measurement sharing request based on a resource availability of the first cell, receiving, from the second cell, an acknowledgement that the second cell is to participate in a measurement sharing procedure in response to the measurement sharing request, and receiving, from the second cell and based on the acknowledgement, one or more channel measurements generated by the second cell that are associated with a UE.

An apparatus for wireless communications at a first cell associated with a first RAT is described. The apparatus may include a processor, memory coupled with the processor, and instructions stored in the memory. The instructions may be executable by the processor to cause the apparatus to transmit, from the first cell and to a second cell associated with a second RAT, a measurement sharing request based on a resource availability of the first cell, receive, from the second cell, an acknowledgement that the second cell is to participate in a measurement sharing procedure in response to the measurement sharing request, and receive, from the second cell and based on the acknowledgement, one or more channel measurements generated by the second cell that are associated with a UE.

Another apparatus for wireless communications at a first cell associated with a first RAT is described. The apparatus may include means for transmitting, from the first cell and to a second cell associated with a second RAT, a measurement sharing request based on a resource availability of the first cell, means for receiving, from the second cell, an acknowledgement that the second cell is to participate in a measurement sharing procedure in response to the measurement sharing request, and means for receiving, from the second cell and based on the acknowledgement, one or more channel measurements generated by the second cell that are associated with a UE.

A non-transitory computer-readable medium storing code for wireless communications at a first cell associated with a first RAT is described. The code may include instructions executable by a processor to transmit, from the first cell and to a second cell associated with a second RAT, a measurement sharing request based on a resource availability of the first cell, receive, from the second cell, an acknowledgement that the second cell is to participate in a measurement sharing procedure in response to the measurement sharing request, and receive, from the second cell and based on the acknowledgement, one or more channel measurements generated by the second cell that are associated with a UE.

Some examples of the method, apparatuses, and non-transitory computer-readable medium described herein may further include operations, features, means, or instructions for generating one or more beamforming weights based on the one or more channel measurements and communicating with the UE using the one or more beamforming weights.

In some examples of the method, apparatuses, and non-transitory computer-readable medium described herein, receiving the one or more channel measurements from the second cell may include operations, features, means, or instructions for receiving, from the second cell, a message indicating an angle of arrival (AoA) or a direction of arrival (DoA) associated with one or more reference signals transmitted by the UE, a speed of the UE, or a combination thereof.

In some examples of the method, apparatuses, and non-transitory computer-readable medium described herein, receiving the one or more channel measurements from the second cell may include operations, features, means, or instructions for receiving, from the second cell, a message indicating a channel response, a received power, a received signal to interference plus noise ratio (SINR), an interference plus noise (IpN) value, or a combination thereof associated with one or more reference signals transmitted by the UE.

In some examples of the method, apparatuses, and non-transitory computer-readable medium described herein, the first RAT may be a New Radio (NR) RAT and the second RAT may be a Long Term Evolution (LTE) RAT.

In some examples of the method, apparatuses, and non-transitory computer-readable medium described herein, the second RAT may be different from the first RAT.

In some examples of the method, apparatuses, and non-transitory computer-readable medium described herein, the second RAT may be the same as the first RAT.

Some examples of the method, apparatuses, and non-transitory computer-readable medium described herein may further include operations, features, means, or instructions for transmitting the measurement sharing request based on the first cell and the second cell having overlapping coverage areas.

Some examples of the method, apparatuses, and non-transitory computer-readable medium described herein may further include operations, features, means, or instructions for transmitting the measurement sharing request based on the UE being in a connected state with the first cell and the second cell.

Some examples of the method, apparatuses, and non-transitory computer-readable medium described herein may further include operations, features, means, or instructions for transmitting the measurement sharing request based on the UE being in a connected state with the first cell and the UE being in an idle state with the second cell.

Some examples of the method, apparatuses, and non-transitory computer-readable medium described herein may further include operations, features, means, or instructions for transmitting the measurement sharing request based on the first cell and the second cell operating in the same radio frequency spectrum band.

Some examples of the method, apparatuses, and non-transitory computer-readable medium described herein may further include operations, features, means, or instructions for scheduling one or more subsequent communications with the UE based on the one or more channel measurements.

A method for wireless communications at a first cell associated with a first RAT is described. The method may include receiving, from a second cell associated with a second RAT, a measurement sharing request based on a resource availability of the first cell, transmitting, from the first cell and to the second cell, an acknowledgement that the first cell is to participate in a measurement sharing procedure in response to the measurement sharing request, generating one or more channel measurements associated with a UE in accordance with the measurement sharing procedure, and transmitting, from the first cell and to the second cell, an indication of the one or more channel measurements in response to the measurement sharing request.

An apparatus for wireless communications at a first cell associated with a first RAT is described. The apparatus may include a processor, memory coupled with the processor, and instructions stored in the memory. The instructions may be executable by the processor to cause the apparatus to receive, from a second cell associated with a second RAT, a measurement sharing request based on a resource availability of the first cell, transmit, from the first cell and to the second cell, an acknowledgement that the first cell is to participate in a measurement sharing procedure in response to the measurement sharing request, generate one or more channel measurements associated with a UE in accordance with the measurement sharing procedure, and transmit, from the first cell and to the second cell, an indication of the one or more channel measurements in response to the measurement sharing request.

Another apparatus for wireless communications at a first cell associated with a first RAT is described. The apparatus may include means for receiving, from a second cell associated with a second RAT, a measurement sharing request based on a resource availability of the first cell, means for transmitting, from the first cell and to the second cell, an acknowledgement that the first cell is to participate in a measurement sharing procedure in response to the measurement sharing request, means for generating one or more channel measurements associated with a UE in accordance with the measurement sharing procedure, and means for transmitting, from the first cell and to the second cell, an indication of the one or more channel measurements in response to the measurement sharing request.

A non-transitory computer-readable medium storing code for wireless communications at a first cell associated with a first RAT is described. The code may include instructions executable by a processor to receive, from a second cell associated with a second RAT, a measurement sharing request based on a resource availability of the first cell, transmit, from the first cell and to the second cell, an acknowledgement that the first cell is to participate in a measurement sharing procedure in response to the measurement sharing request, generate one or more channel measurements associated with a UE in accordance with the measurement sharing procedure, and transmit, from the first cell and to the second cell, an indication of the one or more channel measurements in response to the measurement sharing request.

Some examples of the method, apparatuses, and non-transitory computer-readable medium described herein may further include operations, features, means, or instructions for transmitting, from the first cell and to the UE, a request for the UE to transmit one or more reference signals using a resource allocation and receiving, from the UE, the one or more reference signals based on the resource allocation.

In some examples of the method, apparatuses, and non-transitory computer-readable medium described herein, generating the one or more channel measurements may include operations, features, means, or instructions for generating the one or more channel measurements based on measuring the one or more reference signals.

In some examples of the method, apparatuses, and non-transitory computer-readable medium described herein, transmitting the indication of the one or more channel measurements may include operations, features, means, or instructions for transmitting, from the first cell and to the second cell, a message indicating an AoA or a DoA associated with the one or more reference signals, a speed of the UE, or a combination thereof.

In some examples of the method, apparatuses, and non-transitory computer-readable medium described herein, transmitting the indication of the one or more channel measurements may include operations, features, means, or instructions for transmitting, from the first cell and to the second cell, a message indicating a channel response, a received power, a received SINR, an IpN value, or a combination thereof associated with the one or more reference signals.

In some examples of the method, apparatuses, and non-transitory computer-readable medium described herein, receiving the one or more reference signals may include operations, features, means, or instructions for receiving, from the UE, one or more sounding reference signals (SRSs) based on the resource allocation.

In some examples of the method, apparatuses, and non-transitory computer-readable medium described herein, receiving the one or more reference signals may include operations, features, means, or instructions for receiving, from the UE, one or more demodulation reference signals (DMRSs) or phase tracking reference signals (PTRSs) based on the resource allocation.

In some examples of the method, apparatuses, and non-transitory computer-readable medium described herein, transmitting the request may include operations, features, means, or instructions for transmitting, from the first cell and to the UE, a request for the UE to transmit the one or more reference signals using a physical resource block (PRB) range, an SRS slot offset, an SRS symbol offset, an SRS periodicity, or a combination thereof.

In some examples of the method, apparatuses, and non-transitory computer-readable medium described herein, transmitting the request may include operations, features, means, or instructions for transmitting, from the first cell and to the UE, a radio resource control (RRC) reconfiguration message that indicates the request.

In some examples of the method, apparatuses, and non-transitory computer-readable medium described herein, the first RAT may be an LTE RAT and the second RAT may be a New Radio (NR) RAT.

In some examples of the method, apparatuses, and non-transitory computer-readable medium described herein, the second RAT may be different from the first RAT.

In some examples of the method, apparatuses, and non-transitory computer-readable medium described herein, the second RAT may be the same as the first RAT.

Some examples of the method, apparatuses, and non-transitory computer-readable medium described herein may further include operations, features, means, or instructions for receiving the measurement sharing request based on the first cell and the second cell having overlapping coverage areas.

Some examples of the method, apparatuses, and non-transitory computer-readable medium described herein may further include operations, features, means, or instructions for receiving the measurement sharing request based on the UE being in a connected state with the first cell and the second cell.

Some examples of the method, apparatuses, and non-transitory computer-readable medium described herein may further include operations, features, means, or instructions for receiving the measurement sharing request based on the UE being in a connected state with the second cell and the UE being in an idle state with the first cell.

Some examples of the method, apparatuses, and non-transitory computer-readable medium described herein may further include operations, features, means, or instructions for receiving the measurement sharing request based on the first cell and the second cell operating in the same radio frequency spectrum band.

DETAILED DESCRIPTION

Figure 1:
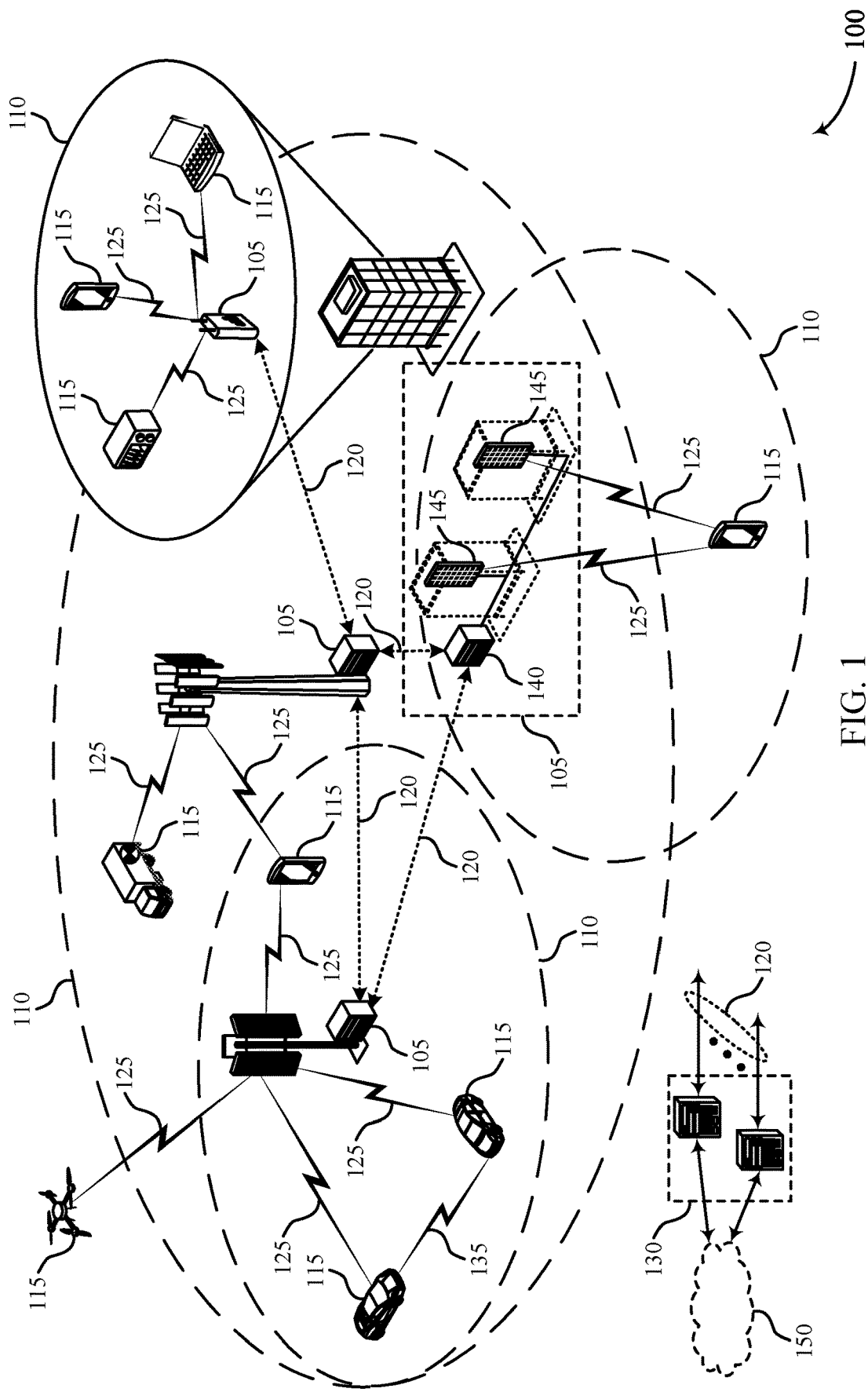
FIGS. 1 and 2 illustrate examples of wireless communications systems that support Node B measurement sharing in accordance with aspects of the present disclosure.

In some wireless communications systems, a first cell (e.g., of a base station) may schedule a user equipment (UE) to transmit one or more reference signals on available resources (e.g., time and frequency resources) of the first cell. For example, the first cell may configure the UE to transmit one or more sounding reference signals (SRSs), demodulation reference signals (DMRSs), or phase tracking reference signals (PTRSs) on resources of the first cell. The first cell may measure the one or more reference signals transmitted by the UE and may use the measured reference signals for channel estimation. In some cases, however, the first cell may have insufficient available resources for scheduling the UE to transmit these reference signals. As such, the first cell may be unable to perform channel estimation, which may reduce the likelihood of successful communications between the first cell and the UE.

In accordance with aspects of the present disclosure, the first cell may improve the likelihood of successful communications between the first cell and the UE based on performing a measurement sharing procedure with a second cell. As an example, the first cell (e.g., a requesting cell) may transmit a measurement sharing request to the second cell (e.g., a responding cell) if the first cell has insufficient available resources for scheduling the UE to transmit one or more reference signals. If the second cell has sufficient available resources for scheduling the UE to transmit the one or more reference signals, the second cell may transmit a measurement sharing acknowledgement to the first cell in response to the measurement sharing request. Otherwise, the second cell may transmit a measurement sharing rejection to the first cell. After transmitting the measurement sharing acknowledgement to the first cell, the second cell may schedule the UE to transmit the one or more reference signals on resources of the second cell and may generate one or more channel measurements for the UE based on measuring the one or more reference signals transmitted by the UE. The second cell may transmit an indication of the one or more channel measurements to the first cell such that the first cell can use the one or more channel measurements to improve communications between the first cell and the UE.

The one or more channel measurements may include an angle of arrival (AoA) or a direction of arrival (DoA) for the one or more reference signals, a received power of the one or more reference signals, a speed of the UE, a channel response measurement, a signal to interference plus noise ratio (SINR), an interference plus noise (IpN) measurement, or a combination thereof. In some examples, the first cell may determine a set of communication parameters (e.g., beamforming weights, resource allocations) for the UE based on the one or more channel measurements generated by the second cell and may use the determined set of communication parameters to perform subsequent communications (e.g., data transmissions) with the UE.

In some examples, the first cell may be associated with a first radio access technology (RAT) and the second cell may be associated with a second RAT. The first RAT may be the same or different from the second RAT. For example, the first cell may be associated with a New Radio (NR) RAT and the second cell may be associated with a Long Term Evolution (LTE) RAT. Alternatively, the first cell may be associated with an LTE RAT and the second cell may be associated with an NR RAT. In other examples, both cells may be associated with an LTE RAT or an NR RAT. In some examples, the first cell and the second cell may have overlapping coverage areas or physically co-located antennas.

Aspects of the present disclosure may be implemented to realize one or more of the following advantages. The described techniques may enable the first cell to improve the reliability of communications between the first cell and the UE based on performing a measurement sharing procedure with the second cell. For example, the described techniques may enable the first cell to obtain channel measurements and determine suitable communication parameters (e.g., beamforming weights, resource allocations) for the UE even if the first cell is unable to schedule transmissions (e.g., SRS transmissions) from the UE on resources of the first cell. The first cell may use these communication parameters to improve the reliability of communications between the first cell and the UE, among other benefits.

Aspects of the disclosure are initially described in the context of wireless communications systems and process flows. Aspects of the disclosure are further illustrated by and described with reference to apparatus diagrams, system diagrams, and flowcharts that relate to Node B measurement sharing.

FIG. 1 illustrates an example of a wireless communications system 100 that supports Node B measurement sharing in accordance with aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given RAT (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different RAT).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular RAT (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) RAT, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

A first cell (e.g., a cell of a base station 105) associated with a first RAT and a second cell associated with a second RAT may have overlapping coverage areas. In some cases, the first cell may be associated with an LTE RAT and the second cell may be associated with an NR RAT (or vice versa). In other cases, both cells may be associated with an LTE RAT or an NR RAT. In some cases, the first cell and the second cell may have co-located antennas such that a direction between a UE 115 and the first cell is similar to a direction between the UE 115 and the second cell. As such, signals transmitted from the UE 115 may arrive at the first cell and the second cell with similar DoAs.

As an example, the first cell may configure the UE 115 to transmit an SRS on available SRS resources of the first cell. The first cell may configure the UE 115 to transmit the SRS based on transmitting a radio resource control (RRC) Reconfiguration message or a system information block (SIB) to the UE 115. Accordingly, the UE 115 may transmit the SRS, which may arrive at the first cell and the second cell with a similar DoA. The first cell (e.g., an LTE cell), the second cell (e.g., an NR cell), or both may measure the SRS transmitted by the UE 115 and may determine a DoA corresponding to the UE 115 based on measuring the SRS. In some cases, if the first cell and the second cell have co-located antennas, the first cell may transmit an indication of the determined DoA to the second cell (or vice versa) such that the second cell can use the determined DoA for channel estimation. That is, the determined DoA may apply to both the first cell and the second cell because the first cell is co-located with the second cell.

In addition to sharing DoA measurements, the first cell and the second cell may also exchange other measurements associated with the UE 115. For example, the second cell may receive an SRS from the UE 115 and may determine a speed of the UE 115 based on measuring the received SRS. Accordingly, the second cell may transmit an indication of the determined speed to the first cell such that the first cell can use the determined speed to estimate channel conditions for the UE 115. In some cases, if the first cell and the second cell operate in the same radio frequency spectrum band (e.g., for LTE and NR spectrum sharing), the first cell and the second cell may also exchange channel response measurements, received power measurements (e.g., reference signal received power (RSRP) measurements), received SINR measurements, IpN measurements, or a combination thereof based on measuring the SRS transmitted by the UE 115.

In some cases, however, the first cell may have insufficient available SRS resources for scheduling the UE 115 to transmit the SRS. In such cases, the first cell may be unable to generate channel measurements for the UE 115 (e.g., based on measuring SRSs transmitted by the UE 115), and may be unable to share such measurements with the second cell. As such, the first cell and the second cell may be unable to estimate channel conditions for the UE 115, which may reduce the likelihood of successful communications with the UE 115.

In accordance with aspects of the present disclosure, the first cell and the second cell may be configured to share SRS resources such that the first cell can use SRS resources associated with the second RAT (e.g., NR) to schedule SRS transmissions from the UE 115. Likewise, the second cell may be configured to use SRS resources associated with the first RAT (e.g., LTE) to schedule SRS transmissions from the UE 115. That is, the first cell and the second cell may be configured to use a shared SRS resource pool that includes SRS resources of the first cell and the second cell. Thus, if the first cell has insufficient available SRS resources to schedule an SRS transmission from the UE 115 but the second cell (e.g., a co-located cell) has sufficient available SRS resources to schedule the SRS transmission, the UE 115 may transmit SRSs on available SRS resources of the second cell. Accordingly, the second cell may generate a set of channel measurements based on measuring the SRSs transmitted by the UE 115 and may transmit an indication of the generated channel measurements to the first cell. As such, the first cell may use the channel measurements generated by the second cell to estimate channel conditions for the UE 115.

The described techniques may enable the first cell and the second cell to utilize available SRS resources with greater efficiency, among other benefits. For example, the described techniques may enable the first cell and the second cell to schedule more concurrent SRS transmissions from UEs 115, which may enable the first cell and the second cell to perform channel estimation with improved accuracy (e.g., based on measuring SRSs transmitted by the UEs 115). Specifically, scheduling more SRS transmissions from the UEs 115 may enable the first cell and the second cell to estimate radio channel conditions for the UEs 115 with improved accuracy, which may improve overall cell capacity of the wireless communications system 100.

Figure 2:
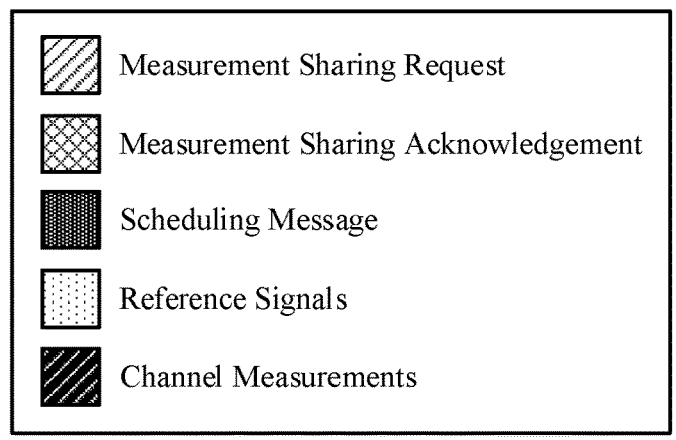
Figure 2:
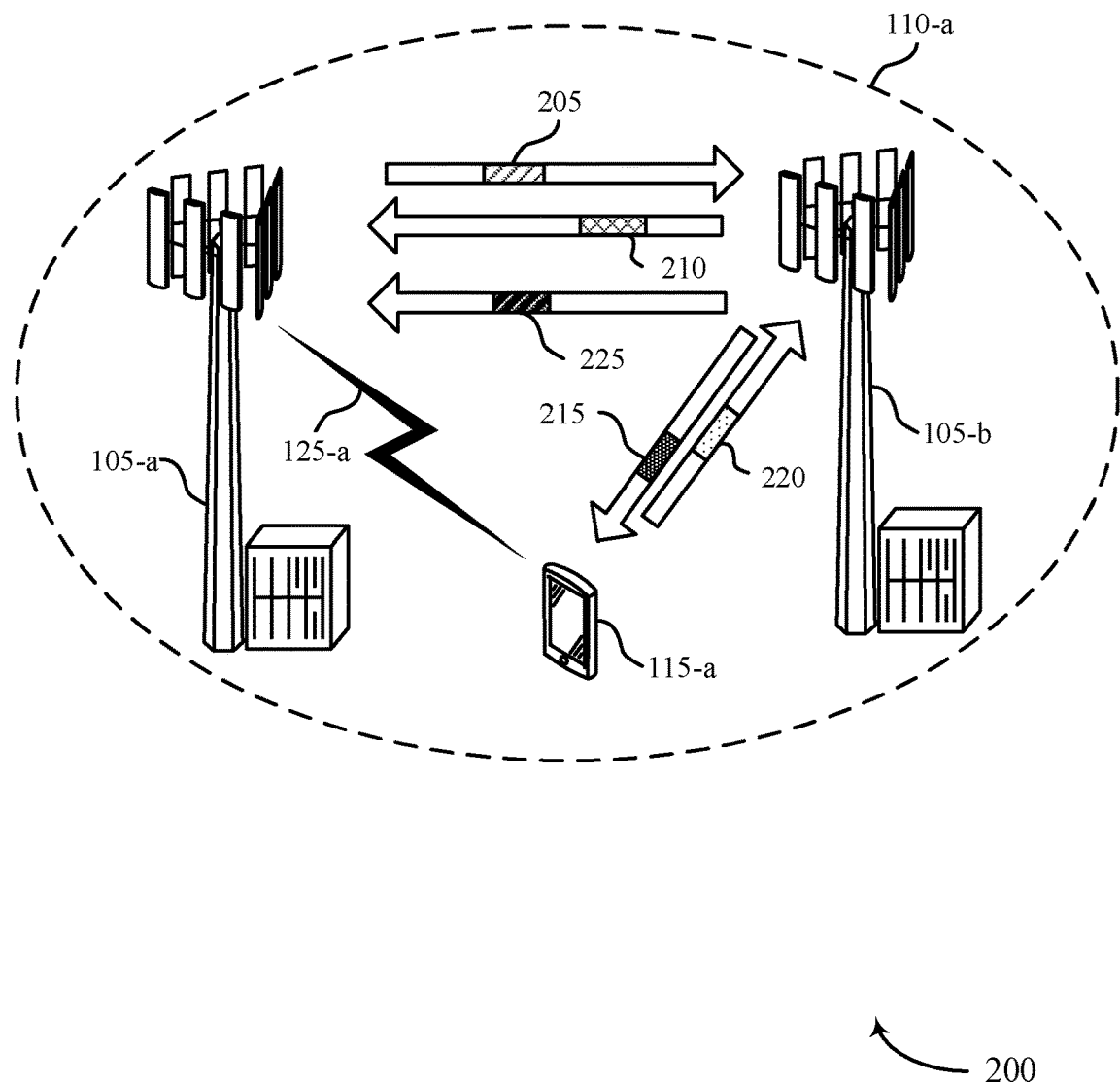

FIG. 2 illustrates an example of a wireless communications system 200 that supports Node B measurement sharing in accordance with aspects of the present disclosure. The wireless communications system 200 may implement or be implemented by aspects of the wireless communications system 100. For example, the wireless communications system 200 may include a UE 115-*a*, a base station 105-*a*, and a base station 105-*b*, which may be examples of corresponding devices described with reference to FIG. 1. The UE 115-*a* and the base stations 105 may communicate within a geographic coverage area 110-*a*, which may be an example of a geographic coverage area 110 described with reference to FIG. 1. In the wireless communications system 200, the base station 105-*b* may generate one or more channel measurements 225 associated with the UE 115-*a* based on receiving a measurement sharing request 205 from the base station 105-*a*.

In the example of FIG. 2, the base station 105-*a* may be an NR cell and the base station 105-*b* may be an LTE cell. However, it is to be understood that the base station 105-*a* may be an LTE cell or any other type of cell. Likewise, it is to be understood that the base station 105-*b* may be an NR cell or any other type of cell. The base station 105-*a* and the base station 105-*b* may have overlapping coverage areas, physically co-located (e.g., shared) antennas, or both. The base station 105-*a* may communicate with the UE 115-*a* over a communication link 125-*a*, which may be an example of a communication link 125 described with reference to FIG. 1. To estimate channel conditions of the communication link 125-*a*, the base station 105-*a* may schedule the UE 115-*a* to transmit one or more reference signals 220 (e.g., SRSs, DMRSs, PTRSs) on available resources (e.g., SRS resources) of the base station 105-*a*. In some cases, however, the base station 105-*a* may have insufficient available resources for scheduling transmission of the one or more reference signals 220.

If the base station 105-*a* is unable to schedule the UE 115-*a* (e.g., if the base station 105-*a* has insufficient available resources), the base station 105-*a* may transmit a measurement sharing request 205 to the base station 105-*b* over an X2 control (X2-C) interface (e.g., via a control plane). The measurement sharing request 205 may indicate a request for a resource availability of the base station 105-*b*. Additionally or alternatively, the measurement sharing request 205 may indicate a request for one or more channel measurements associated with the UE 115-*a*.

If the base station 105-*b* can schedule the UE 115-*a* to transmit the one or more reference signals 220 on resources of the base station 105-*b* (e.g., if the base station 105 has sufficient available resources for scheduling the UE 115-*a*), the base station 105-*b* may transmit a measurement sharing acknowledgement 210 to the base station 105-*a*. Otherwise, the base station 105-*b* may respond to the measurement sharing request 205 with a measurement sharing rejection. If the base station 105-*b* responds to the measurement sharing request 205 with a measurement sharing acknowledgement 210, the base station 105-*b* may transmit a scheduling message 215 to the UE 115-*a*. The scheduling message 215 may indicate resources allocated for transmission of the one or more reference signals 220. Specifically, the scheduling message 215 may indicate a physical resource block (PRB) range, an SRS slot offset, an SRS symbol offset, an SRS periodicity, or a combination thereof that the UE 115-*a* may use to transmit the one or more reference signals 220.

In some examples (e.g., if the UE 115-*a* supports evolved universal mobile telecommunications system (UMTS) terrestrial radio access network (E-UTRAN) NR Dual Connectivity (EN-DC)), the UE 115-*a* may be in a connected state (e.g., RRC_CONNECTED) with respect to the base station 105-*a* and the base station 105-*b*. In such examples, the scheduling message 215 may be or may include an RRC Reconfiguration message. Alternatively, the UE 115-*a* may be in a connected state with respect to the base station 105-*a* and may be in an idle state (e.g., RRC_IDLE) with respect to the base station 105-*b*. In such examples, the scheduling message 215 may include a request for the UE 115-*a* to attach (e.g., connect) to the base station 105-*b*. Accordingly, the UE 115-*a* may perform a random access procedure to connect with the base station 105-*b* prior to transmitting the one or more reference signals 220.

The UE 115-*a* may transmit the one or more reference signals 220 on available resources of the base station 105-*b* in accordance with the scheduling message 215. The base station 105-*b* may measure the one or more reference signals 220 transmitted by the UE 115-*a* and may generate one or more channel measurements 225 based on measuring the one or more reference signals 220. For example, the base station 105-*b* may determine a DoA or an AoA of the one or more reference signals 220, a received power of the one or more reference signals 220, a received SINR for the one or more reference signals 220, a speed of the UE 115-*a* (e.g., for mitigating doppler shift caused by movement of the UE 115-*a*), a channel response measurement (e.g., based on the speed of the UE 115-*a*), an IpN measurement, or a combination thereof based on measuring the one or more reference signals 220 transmitted by the UE 115-*a*. In some examples (e.g., for instant spectrum sharing (ISS) or dynamic spectrum sharing (DSS) between LTE and NR), the one or more channel measurements 225 may correspond to a shared radio frequency spectrum range of the base stations 105.

After generating the one or more channel measurements 225, the base station 105-*b* may forward the one or more channel measurements 225 to the base station 105-*a*. Specifically, the base station 105-*b* may forward the one or more channel measurements 225 to the base station 105-*a* over an X2 user (X2-U) interface (e.g., via a user plane). In some examples, the base station 105-*a* may generate a set of beamforming weights based on receiving the one or more channel measurements 225 from the base station 105-*b*. The base station 105-*a* may use the generated beamforming weights for subsequent uplink or downlink communications with the UE 115-*a*. Additionally or alternatively, the base station 105-*a* may schedule subsequent communications with the UE 115-*a* based on the one or more channel measurements 225. Specifically, the base station 105-*a* may use the one or more channel measurements 225 to identify resources (e.g., PRBs) on which to schedule subsequent communications with the UE 115-*a* (e.g., resources that are associated with relatively good radio channel conditions for the UE 115-*a*). Using the identified resources for subsequent communications with the UE 115-*a* may improve the likelihood of successful communications between the base station 105-*a* and the UE 115-*a*.

The described techniques may enable the base station 105-*a* to obtain the one or more channel measurements 225 for the UE 115-*a* even if the base station 105-*a* is unable to schedule the UE 115-*a* to transmit the one or more reference signals 220 on resources of the base station 105-*a*. Likewise, if the base station 105-*b* is unable to schedule the UE 115-*a* to transmit reference signals on resources of the base station 105-*b* (e.g., if the LTE cell has no available resources but the NR cell has available resources), the described techniques may enable the base station 105-*b* to obtain channel measurements for the UE 115-*a* based on transmitting a measurement sharing request to the base station 105-*a*. As a result, the base stations 105 may utilize available resources with greater efficiency and may estimate channel conditions for the UE 115-*a* with greater accuracy, among other benefits.

Figure 3:
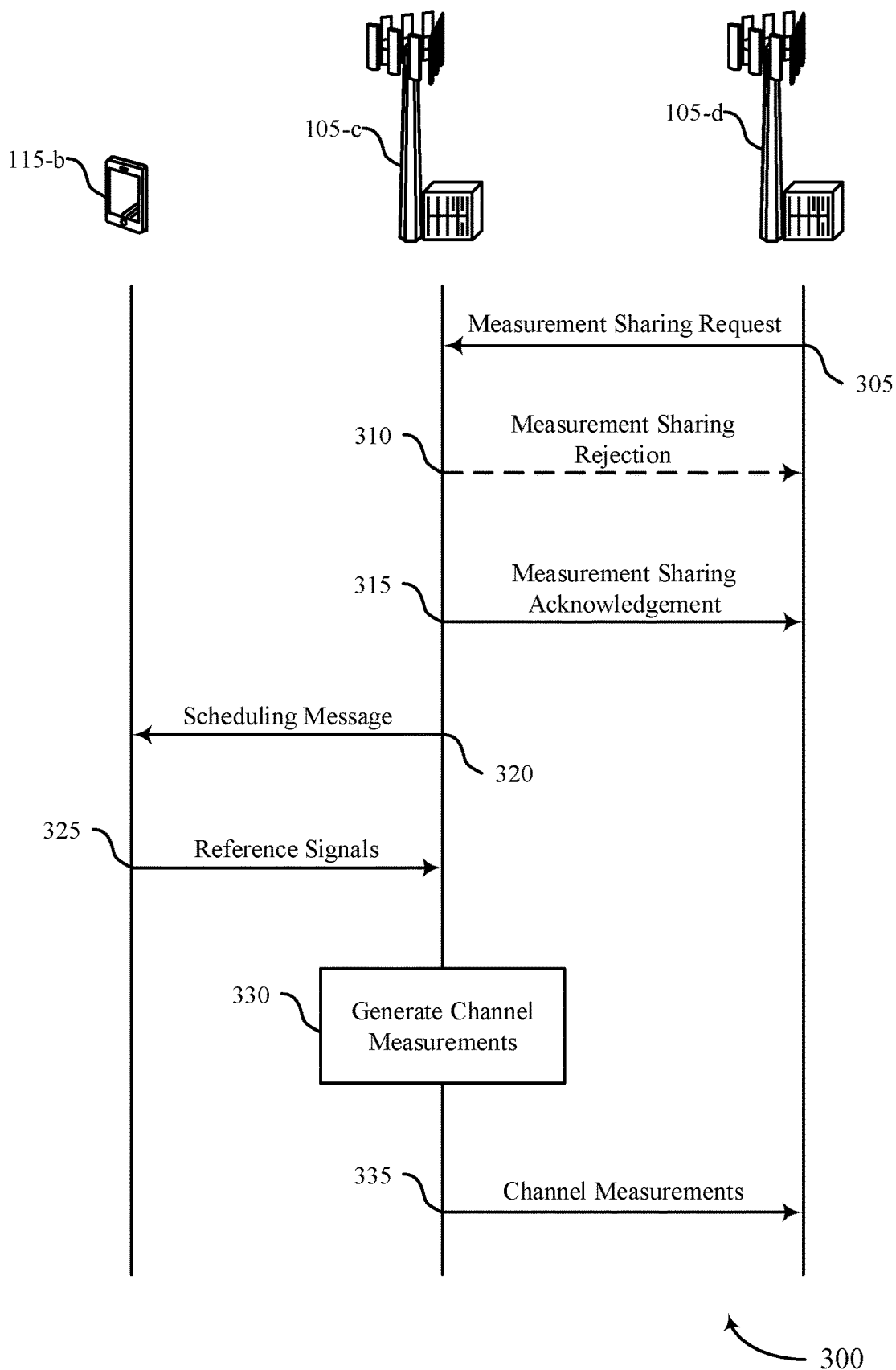
FIG. 3 illustrates an example of a process flow that supports Node B measurement sharing in accordance with aspects of the present disclosure.

FIG. 3 illustrates an example of a process flow 300 that supports Node B measurement sharing in accordance with aspects of the present disclosure. The process flow 300 may implement or be implemented by aspects of the wireless communications system 100 or the wireless communications system 200. For example, the process flow 300 may include a UE 115-b, a base station 105-c, and a base station 105-d, which may be examples of corresponding devices described with reference to FIGS. 1 and 2. In the following description of the process flow 300, operations between the UE 115-b, the base station 105-c, and the base station 105-d may be performed in a different order or at a different time than as shown. Additionally or alternatively, some operations may be omitted from the process flow 300, and other operations may be added to the process flow 300.

At 305, the base station 105-d (e.g., a requesting cell) may transmit a measurement sharing request to the base station 105-c (e.g., a responding cell). The measurement sharing request may indicate a request for the base station 105-c to schedule transmissions (e.g., of one or more reference signals) from a UE 115-b on available resources of the base station 105-c. In some examples, the base station 105-d may transmit the measurement sharing request based on the base station 105-d and the base station 105-c having overlapping coverage areas. Additionally or alternatively, the base station 105-d may transmit the measurement sharing request based on the base station 105-d and the base station 105-c operating in a shared radio frequency spectrum band.

In some examples, the base station 105-d may be associated with a first RAT and the base station 105-d may be associated with a second RAT. The first RAT may be the same or different from the second RAT. In some examples, the first RAT may be an NR RAT or an LTE RAT. Likewise, the second RAT may be an NR RAT or an LTE RAT. In some examples, the UE 115-b may be in a connected state (e.g., RRC_CONNECTED) with the base station 105-c and the base station 105-d. In other examples, the UE 115-b may be in a connected state with the base station 105-d and may be an idle state (e.g., RRC_IDLE) with the base station 105-c.

In some examples, the base station 105-c may transmit a measurement sharing rejection message to the base station 105-d at 310 based on a resource availability of the base station 105-c. For example, the base station 105-c may transmit a measurement sharing rejection message to the base station 105-d if the base station 105-c has insufficient available resources for scheduling the requested transmissions from the UE 115-b. In other examples, the base station 105-c may transmit a measurement sharing acknowledgement to the base station 105-d at 315 based on the resource availability of the base station 105-c. For example, the base station 105-c may transmit a measurement sharing acknowledgement message to the base station 105-d if the base station 105-c has sufficient available resources to schedule the requested transmissions from the UE 115-b.

At 320, the base station 105-c may schedule the UE 115-b to transmit one or more reference signals on available resources of the base station 105-c in accordance with the measurement sharing request. Specifically, the base station 105-c may transmit a message (e.g., an RRC Reconfiguration message or an attach command) to the UE 115-b requesting that the UE 115-b transmit the one or more reference signals using a PRB range, an SRS slot offset, an SRS symbol offset, an SRS periodicity, or a combination thereof.

At 325, the UE 115-b may transmit the one or more reference signals on available resources of the base station 105-c. In some examples, the one or more reference signals may include one or more SRSs, DMRSs, or PTRSs. At 330, the base station 105-c may generate one or more channel measurements based on measuring the one or more reference signals transmitted by the UE 115-b. The one or more channel measurements may include a DoA of the one or more reference signals, an AoA of the one or more reference signals, a received power of the one or more reference signals, a received SINR for the one or more reference signals, a channel response measurement, an IpN measurement, a speed of the UE 115-b, or a combination thereof.

At 335, the base station 105-c may transmit an indication of the one or more channel measurements to the base station 105-d. In some examples, the base station 105-d may determine suitable beamforming weights or resource allocations (e.g., PRBs) for the UE 115-b based on receiving the indication of the one or more channel measurements from the base station 105-c. Determining communication parameters (e.g., beamforming weights, resource allocations) for the UE 115-b based on channel measurements generated by the base station 105-c may enable the base station 105-d to improve communications with the UE 115-b even if the base station 105-d is unable to schedule transmissions (e.g., reference signal transmissions) from the UE 115-b on resources of the base station 105-d.

Figure 4:
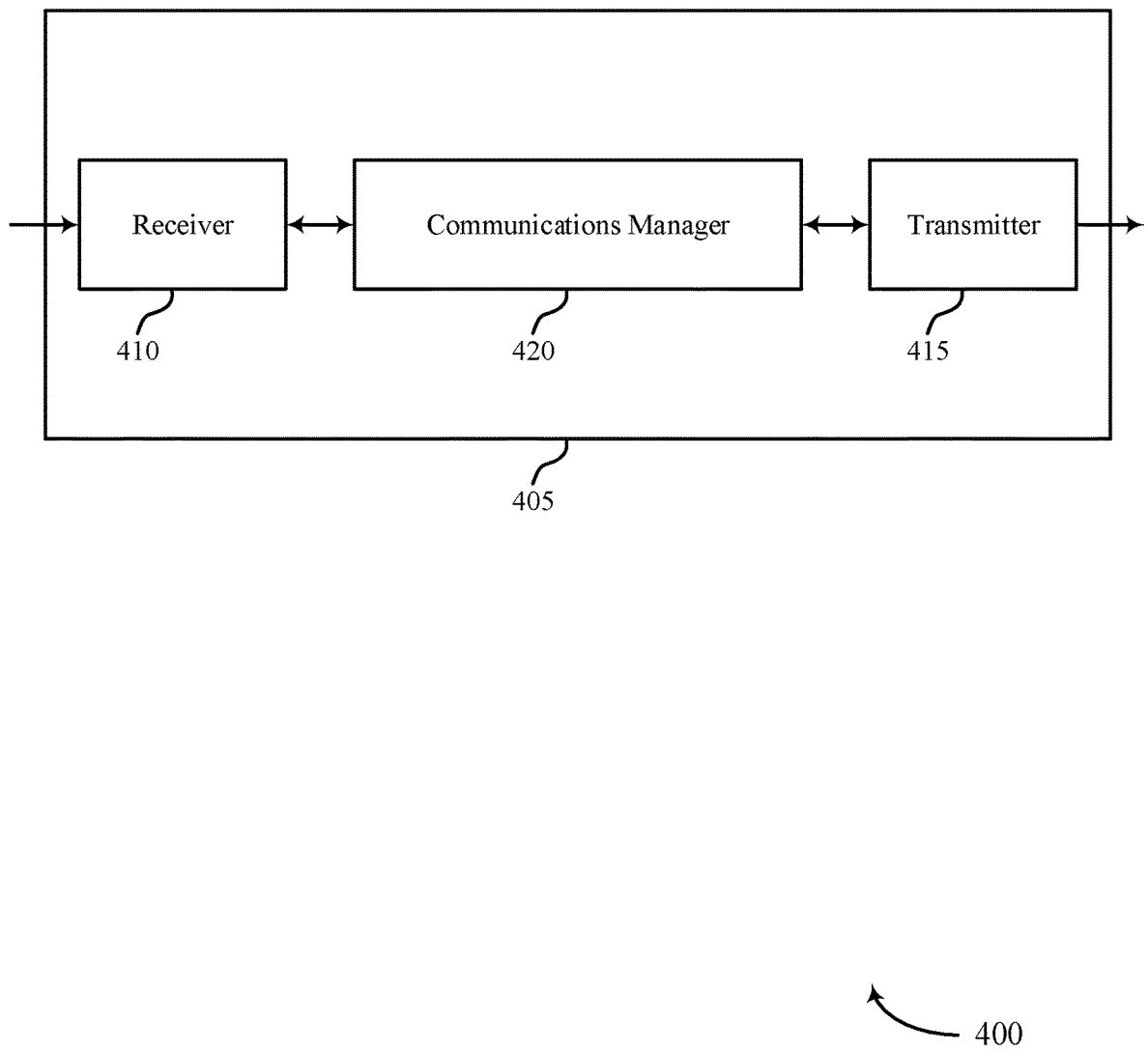
FIGS. 4 and 5 show block diagrams of devices that support Node B measurement sharing in accordance with aspects of the present disclosure.

FIG. 4 shows a block diagram 400 of a device 405 that supports Node B measurement sharing in accordance with aspects of the present disclosure. The device 405 may be an example of aspects of a base station 105 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to Node B measurement sharing). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to Node B measurement sharing). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of Node B measurement sharing as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an ASIC, a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communications at the device 405 (e.g., a first cell) associated with a first RAT in accordance with examples as disclosed herein. For example, the communications manager 420 may be configured as or otherwise support a means for transmitting, from the device 405 and to a second cell associated with a second RAT, a measurement sharing request based on a resource availability of the device 405. The communications manager 420 may be configured as or otherwise support a means for receiving, from the second cell, an acknowledgement that the second cell is to participate in a measurement sharing procedure in response to the measurement sharing request. The communications manager 420 may be configured as or otherwise support a means for receiving, from the second cell and based on the acknowledgement, one or more channel measurements generated by the second cell that are associated with a UE.

Additionally or alternatively, the communications manager 420 may support wireless communications at the device 405 (e.g., a first cell) associated with a first RAT in accordance with examples as disclosed herein. For example, the communications manager 420 may be configured as or otherwise support a means for receiving, from a second cell associated with a second RAT, a measurement sharing request based on a resource availability of the second cell. The communications manager 420 may be configured as or otherwise support a means for transmitting, from the device 405 and to the second cell, an acknowledgement that the device 405 is to participate in a measurement sharing procedure in response to the measurement sharing request. The communications manager 420 may be configured as or otherwise support a means for generating one or more channel measurements associated with a UE in accordance with the measurement sharing procedure. The communications manager 420 may be configured as or otherwise support a means for transmitting, from the device 405 and to the second cell, an indication of the one or more channel measurements in response to the measurement sharing request.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for more efficient utilization of communication resources based on performing a measurement sharing procedure. For example, the described techniques may enable the device 405 to schedule SRS transmissions from a UE on available SRS resources of a co-located cell, which may enable the device 405 and the co-located cell to utilize available SRS resources with greater efficiency, among other benefits.

Figure 5:
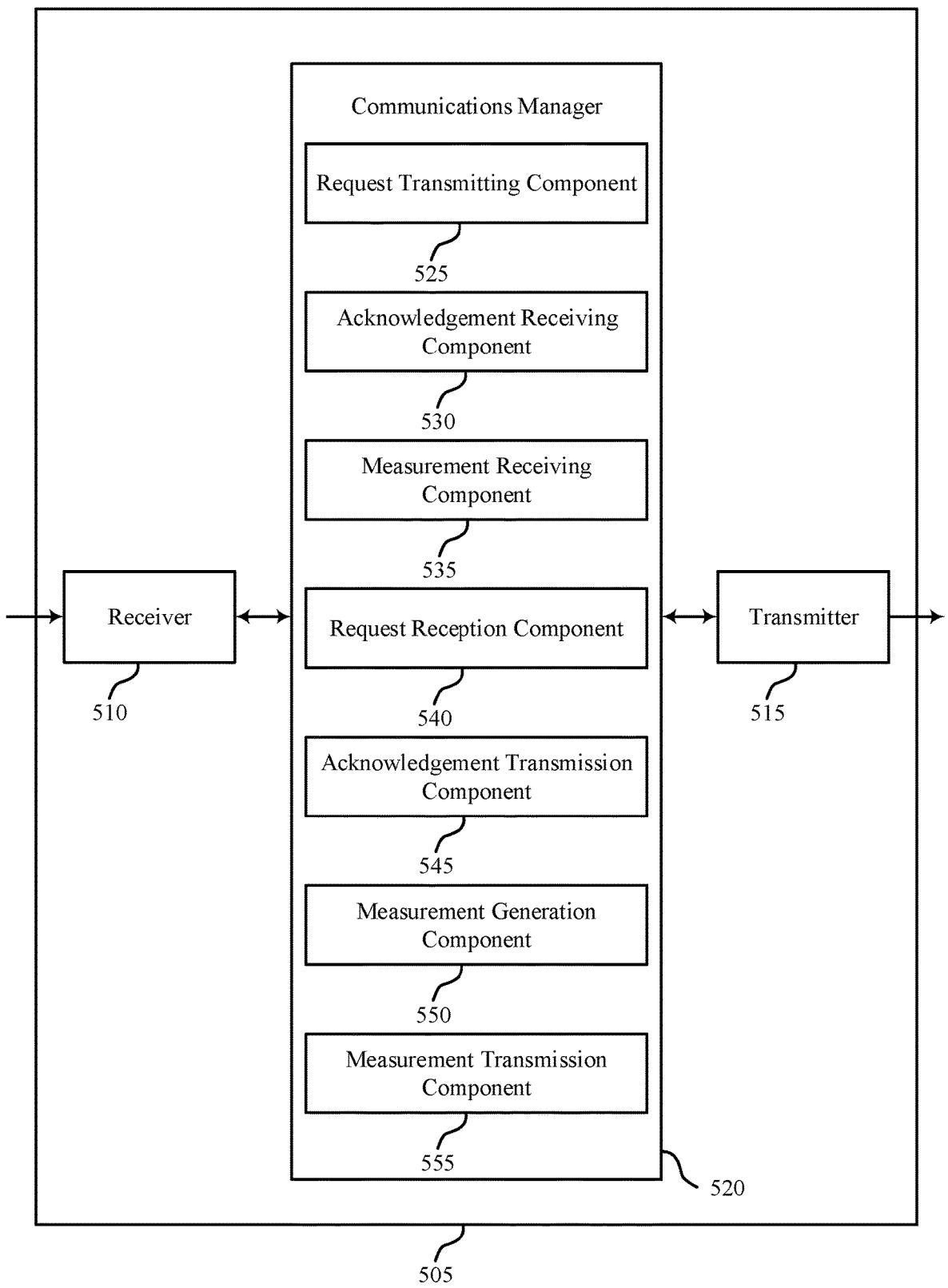

FIG. 5 shows a block diagram 500 of a device 505 that supports Node B measurement sharing in accordance with aspects of the present disclosure. The device 505 may be an example of aspects of a device 405 or a base station 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to Node B measurement sharing). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to Node B measurement sharing). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of Node B measurement sharing as described herein. For example, the communications manager 520 may include a request transmitting component 525, an acknowledgement receiving component 530, a measurement receiving component 535, a request reception component 540, an acknowledgement transmission component 545, a measurement generation component 550, a measurement transmission component 555, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at the device 505 (e.g., a first cell) associated with a first RAT in accordance with examples as disclosed herein. The request transmitting component 525 may be configured as or otherwise support a means for transmitting, from the device 505 and to a second cell associated with a second RAT, a measurement sharing request based on a resource availability of the device 505. The acknowledgement receiving component 530 may be configured as or otherwise support a means for receiving, from the second cell, an acknowledgement that the second cell is to participate in a measurement sharing procedure in response to the measurement sharing request. The measurement receiving component 535 may be configured as or otherwise support a means for receiving, from the second cell and based on the acknowledgement, one or more channel measurements generated by the second cell that are associated with a UE.

Additionally or alternatively, the communications manager 520 may support wireless communications at the device 505 (e.g., a first cell) associated with a first RAT in accordance with examples as disclosed herein. The request reception component 540 may be configured as or otherwise support a means for receiving, from a second cell associated with a second RAT, a measurement sharing request based on a resource availability of the second cell. The acknowledgement transmission component 545 may be configured as or otherwise support a means for transmitting, from the device 505 and to the second cell, an acknowledgement that the device 505 is to participate in a measurement sharing procedure in response to the measurement sharing request. The measurement generation component 550 may be configured as or otherwise support a means for generating one or more channel measurements associated with a UE in accordance with the measurement sharing procedure. The measurement transmission component 555 may be configured as or otherwise support a means for transmitting, from the device 505 and to the second cell, an indication of the one or more channel measurements in response to the measurement sharing request.

Figure 6:
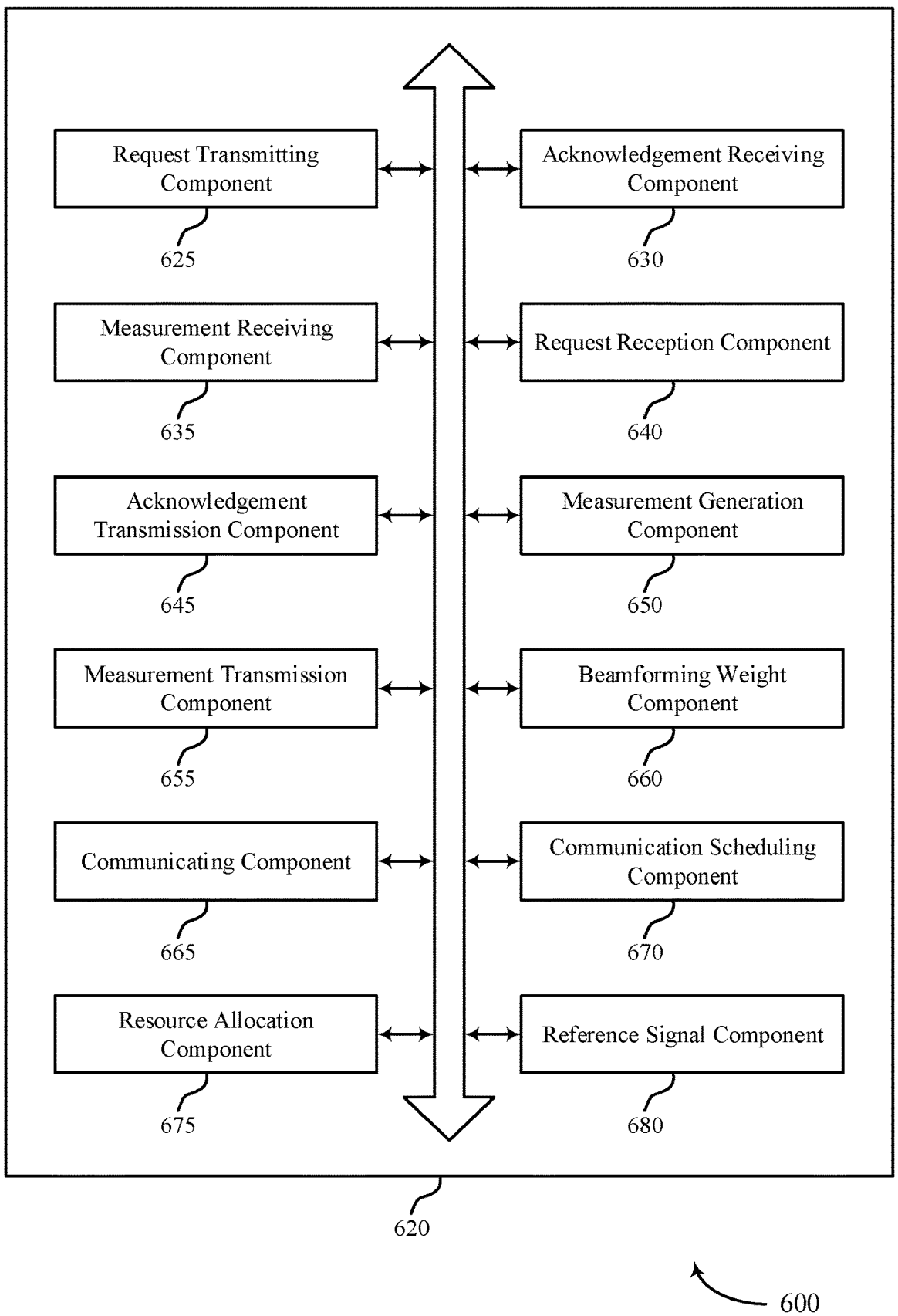
FIG. 6 shows a block diagram of a communications manager that supports Node B measurement sharing in accordance with aspects of the present disclosure.

FIG. 6 shows a block diagram 600 of a communications manager 620 that supports Node B measurement sharing in accordance with aspects of the present disclosure. The communications manager 620 may be an example of aspects of a communications manager 420, a communications manager 520, or both, as described herein. The communications manager 620, or various components thereof, may be an example of means for performing various aspects of Node B measurement sharing as described herein. For example, the communications manager 620 may include a request transmitting component 625, an acknowledgement receiving component 630, a measurement receiving component 635, a request reception component 640, an acknowledgement transmission component 645, a measurement generation component 650, a measurement transmission component 655, a beamforming weight component 660, a communicating component 665, a communication scheduling component 670, a resource allocation component 675, a reference signal component 680, or any combination thereof. Each of these components may communicate, directly or indirectly, with one another (e.g., via one or more buses).

The communications manager 620 may support wireless communications at the device 605 (e.g., a first cell) associated with a first RAT in accordance with examples as disclosed herein. The request transmitting component 625 may be configured as or otherwise support a means for transmitting, from the device 605 and to a second cell associated with a second RAT, a measurement sharing request based on a resource availability of the device 605.

In some examples, transmitting the measurement sharing request is further based on the device 605 and the second cell having overlapping coverage areas. In some examples, transmitting the measurement sharing request is further based on the UE being in a connected state with the device 605 and the second cell. In some examples, transmitting the measurement sharing request is further based on the UE being in a connected state with the device 605 and the UE being in an idle state with the second cell. In some examples, transmitting the measurement sharing request is further based on the device 605 and the second cell operating in the same radio frequency spectrum band.

In some examples, the first RAT associated with the first cell is an NR RAT and the second RAT associated with the second cell is an LTE RAT. In some examples, the second RAT is different from the first RAT. In other examples, the second RAT is the same as the first RAT.

The acknowledgement receiving component 630 may be configured as or otherwise support a means for receiving, from the second cell, an acknowledgement that the second cell is to participate in a measurement sharing procedure in response to the measurement sharing request. The measurement receiving component 635 may be configured as or otherwise support a means for receiving, from the second cell and based on the acknowledgement, one or more channel measurements generated by the second cell that are associated with a UE.

In some examples, the beamforming weight component 660 may be configured as or otherwise support a means for generating one or more beamforming weights based on the one or more channel measurements. In some examples, the communicating component 665 may be configured as or otherwise support a means for communicating with the UE using the one or more beamforming weights.

In some examples, to support receiving the one or more channel measurements from the second cell, the measurement receiving component 635 may be configured as or otherwise support a means for receiving, from the second cell, a message indicating an AoA or a DoA associated with one or more reference signals transmitted by the UE, a speed of the UE, or a combination thereof.

In some examples, to support receiving the one or more channel measurements from the second cell, the measurement receiving component 635 may be configured as or otherwise support a means for receiving, from the second cell, a message indicating a channel response, a received power, a received SINR, an IpN value, or a combination thereof associated with one or more reference signals transmitted by the UE.

In some examples, the communication scheduling component 670 may be configured as or otherwise support a means for scheduling one or more subsequent communications with the UE based on the one or more channel measurements.

Additionally or alternatively, the communications manager 620 may support wireless communications at the device 605 (e.g., a first cell) associated with a first RAT in accordance with examples as disclosed herein. The request reception component 640 may be configured as or otherwise support a means for receiving, from a second cell associated with a second RAT, a measurement sharing request based on a resource availability of the second cell. In some examples, receiving the measurement sharing request is further based on the device 605 and the second cell having overlapping coverage areas. In some examples, receiving the measurement sharing request is further based on the UE being in a connected state with the device 605 and the second cell. In some examples, receiving the measurement sharing request is further based on the UE being in a connected state with the second cell and the UE being in an idle state with the device 605. In some examples, receiving the measurement sharing request is further based on the device 605 and the second cell operating in the same radio frequency spectrum band.

In some examples, the first RAT is an LTE RAT and the second RAT is an NR RAT. In some examples, the second RAT is different from the first RAT. In some examples, the second RAT is the same as the first RAT.

The acknowledgement transmission component 645 may be configured as or otherwise support a means for transmitting, from the device 605 and to the second cell, an acknowledgement that the device 605 is to participate in a measurement sharing procedure in response to the measurement sharing request. The measurement generation component 650 may be configured as or otherwise support a means for generating one or more channel measurements associated with a UE in accordance with the measurement sharing procedure. The measurement transmission component 655 may be configured as or otherwise support a means for transmitting, from the device 605 and to the second cell, an indication of the one or more channel measurements in response to the measurement sharing request.

In some examples, the resource allocation component 675 may be configured as or otherwise support a means for transmitting, from the device 605 and to the UE, a request for the UE to transmit one or more reference signals using a resource allocation. In some examples, the reference signal component 680 may be configured as or otherwise support a means for receiving, from the UE, the one or more reference signals based on the resource allocation.

In some examples, to support generating the one or more channel measurements, the measurement generation component 650 may be configured as or otherwise support a means for generating the one or more channel measurements based on measuring the one or more reference signals.

In some examples, to support transmitting the indication of the one or more channel measurements, the measurement transmission component 655 may be configured as or otherwise support a means for transmitting, from the device 605 and to the second cell, a message indicating an AoA or a DoA associated with the one or more reference signals, a speed of the UE, or a combination thereof.

In some examples, to support transmitting the indication of the one or more channel measurements, the measurement transmission component 655 may be configured as or otherwise support a means for transmitting, from the device 605 and to the second cell, a message indicating a channel response, a received power, a received SINR, an IpN value, or a combination thereof associated with the one or more reference signals.

In some examples, to support receiving the one or more reference signals, the reference signal component 680 may be configured as or otherwise support a means for receiving, from the UE, one or more SRSs based on the resource allocation.

In some examples, to support receiving the one or more reference signals, the reference signal component 680 may be configured as or otherwise support a means for receiving, from the UE, one or more DMRSs or PTRSs based on the resource allocation.

In some examples, to support transmitting the request, the resource allocation component 675 may be configured as or otherwise support a means for transmitting, from the device 605 and to the UE, a request for the UE to transmit the one or more reference signals using a PRB range, an SRS slot offset, an SRS symbol offset, an SRS periodicity, or a combination thereof.

In some examples, to support transmitting the request, the resource allocation component 675 may be configured as or otherwise support a means for transmitting, from the device 605 and to the UE, a RRC reconfiguration message that indicates the request.

Figure 7:
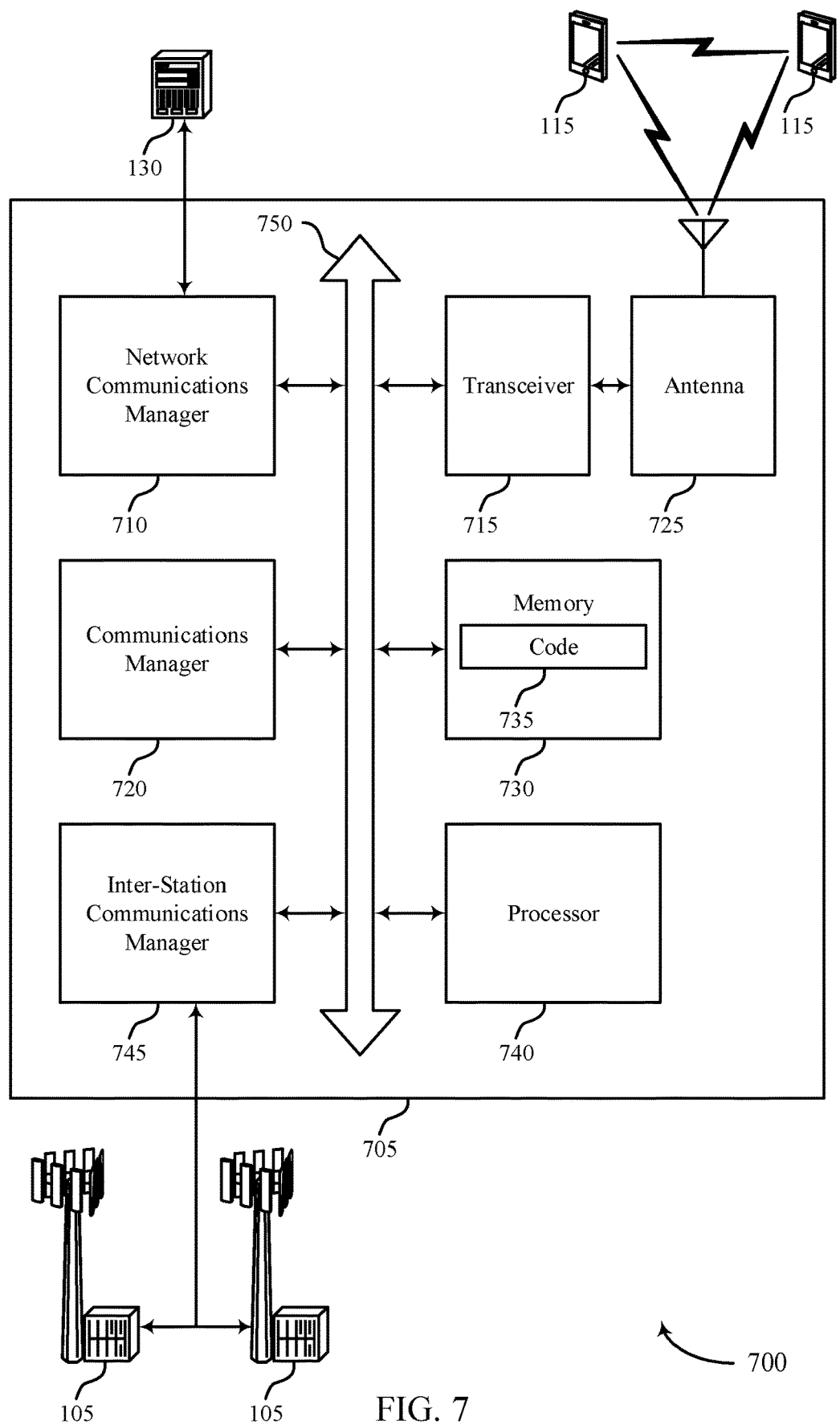
FIG. 7 shows a diagram of a system including a device that supports Node B measurement sharing in accordance with aspects of the present disclosure.

FIG. 7 shows a diagram of a system 700 including a device 705 that supports Node B measurement sharing in accordance with aspects of the present disclosure. The device 705 may be an example of or include the components of a device 405, a device 505, or a base station 105 as described herein. The device 705 may communicate wirelessly with one or more base stations 105, UEs 115, or any combination thereof. The device 705 may include components for bi-directional voice and data communications including components for transmitting and receiving communications, such as a communications manager 720, a network communications manager 710, a transceiver 715, an antenna 725, a memory 730, code 735, a processor 740, and an inter-station communications manager 745. These components may be in electronic communication or otherwise coupled (e.g., operatively, communicatively, functionally, electronically, electrically) via one or more buses (e.g., a bus 750).

The network communications manager 710 may manage communications with a core network 130 (e.g., via one or more wired backhaul links). For example, the network communications manager 710 may manage the transfer of data communications for client devices, such as one or more UEs 115.

In some cases, the device 705 may include a single antenna 725. However, in some other cases the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and ROM. The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting Node B measurement sharing). For example, the device 705 or a component of the device 705 may include a processor 740 and memory 730 coupled to the processor 740, the processor 740 and memory 730 configured to perform various functions described herein.

The inter-station communications manager 745 may manage communications with other base stations 105, and may include a controller or scheduler for controlling communications with UEs 115 in cooperation with other base stations 105. For example, the inter-station communications manager 745 may coordinate scheduling for transmissions to UEs 115 for various interference mitigation techniques such as beamforming or joint transmission. In some examples, the inter-station communications manager 745 may provide an X2 interface within an LTE/LTE-A wireless communications network technology to provide communication between base stations 105.

The communications manager 720 may support wireless communications at the device 705 (e.g., a first cell) associated with a first RAT in accordance with examples as disclosed herein. For example, the communications manager 720 may be configured as or otherwise support a means for transmitting, from the device 705 and to a second cell associated with a second RAT, a measurement sharing request based on a resource availability of the device 705. The communications manager 720 may be configured as or otherwise support a means for receiving, from the second cell, an acknowledgement that the second cell is to participate in a measurement sharing procedure in response to the measurement sharing request. The communications manager 720 may be configured as or otherwise support a means for receiving, from the second cell and based on the acknowledgement, one or more channel measurements generated by the second cell that are associated with a UE.

Additionally or alternatively, the communications manager 720 may support wireless communications at the device 705 (e.g., a first cell) associated with a first RAT in accordance with examples as disclosed herein. For example, the communications manager 720 may be configured as or otherwise support a means for receiving, from a second cell associated with a second RAT, a measurement sharing request based on a resource availability of the second cell. The communications manager 720 may be configured as or otherwise support a means for transmitting, from the device 705 and to the second cell, an acknowledgement that the device 705 is to participate in a measurement sharing procedure in response to the measurement sharing request. The communications manager 720 may be configured as or otherwise support a means for generating one or more channel measurements associated with a UE in accordance with the measurement sharing procedure. The communications manager 720 may be configured as or otherwise support a means for transmitting, from the device 705 and to the second cell, an indication of the one or more channel measurements in response to the measurement sharing request.

By including or configuring the communications manager 720 in accordance with examples as described herein, the device 705 may support techniques for improved channel estimation based on performing a measurement sharing procedure with a nearby cell. For example, the described techniques may enable the device 705 to obtain channel measurements for a UE even if the device 705 has insufficient available resources to schedule transmissions (e.g., SRS transmissions) from the UE. The device 705 may use these channel measurements to determine communication parameters (e.g., beamforming weights, resource allocations) for the UE. As a result, the device 705 and the UE may communicate with improved reliability, among other benefits.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of Node B measurement sharing as described herein, or the processor 740 and the memory 730 may be otherwise configured to perform or support such operations.

Figure 8:
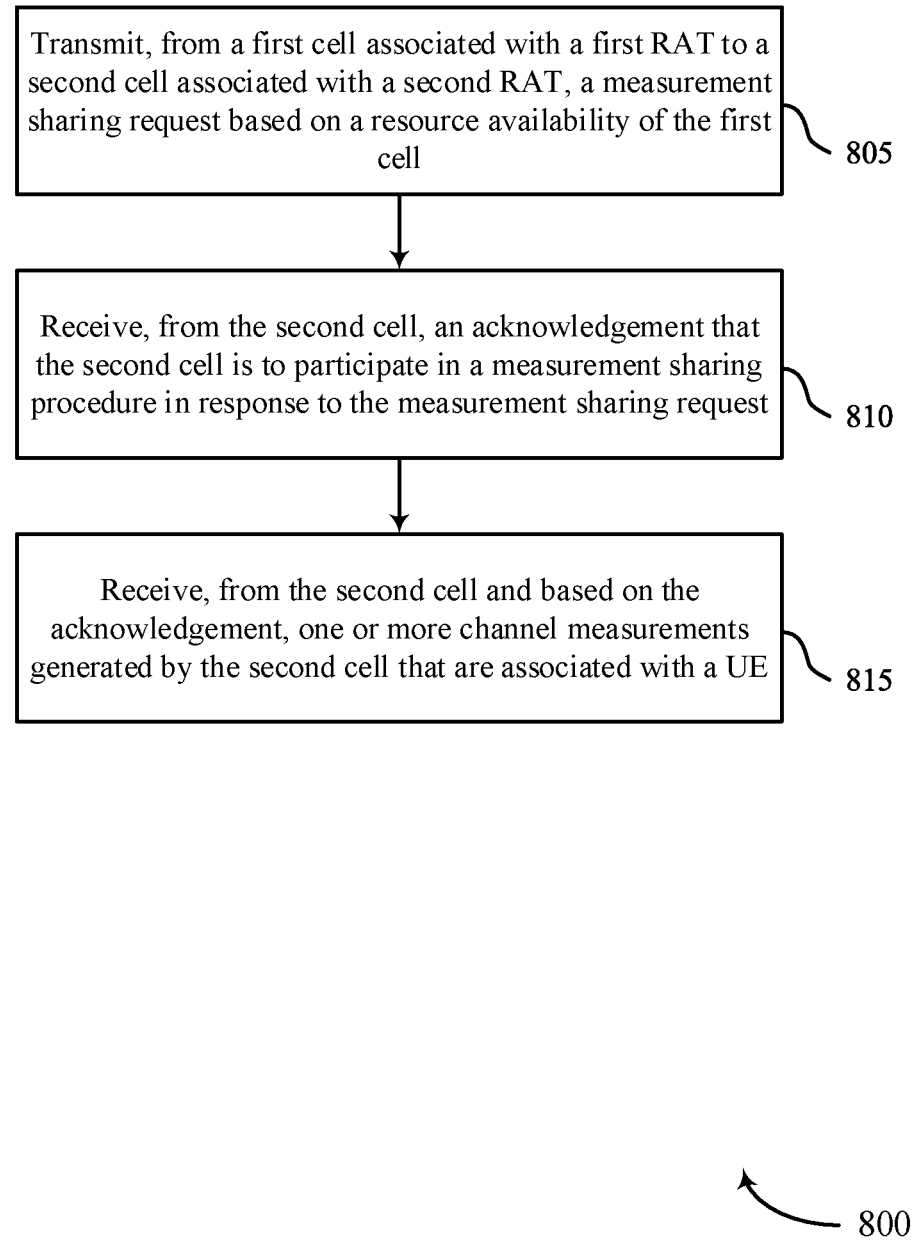
FIGS. 8 through 11 show flowcharts illustrating methods that support Node B measurement sharing in accordance with aspects of the present disclosure.

FIG. 8 shows a flowchart illustrating a method 800 that supports Node B measurement sharing in accordance with aspects of the present disclosure. The operations of the method 800 may be implemented by a first cell (e.g., a base station) or its components as described herein. For example, the operations of the method 800 may be performed by a base station 105 as described with reference to FIGS. 1 through 7. In some examples, the first cell may execute a set of instructions to control the functional elements of the first cell to perform the described functions. Additionally or alternatively, the first cell may perform aspects of the described functions using special-purpose hardware.

At 805, the method may include transmitting, from a first cell associated with a first RAT and to a second cell associated with a second RAT, a measurement sharing request based on a resource availability of the first cell. The operations of 805 may be performed in accordance with examples as disclosed herein. In some examples, aspects of the operations of 805 may be performed by a request transmitting component 625 as described with reference to FIG. 6.

At 810, the method may include receiving, from the second cell, an acknowledgement that the second cell is to participate in a measurement sharing procedure in response to the measurement sharing request. The operations of 810 may be performed in accordance with examples as disclosed herein. In some examples, aspects of the operations of 810 may be performed by an acknowledgement receiving component 630 as described with reference to FIG. 6.

At 815, the method may include receiving, from the second cell and based on the acknowledgement, one or more channel measurements generated by the second cell that are associated with a UE. The operations of 815 may be performed in accordance with examples as disclosed herein. In some examples, aspects of the operations of 815 may be performed by a measurement receiving component 635 as described with reference to FIG. 6.

Figure 9:
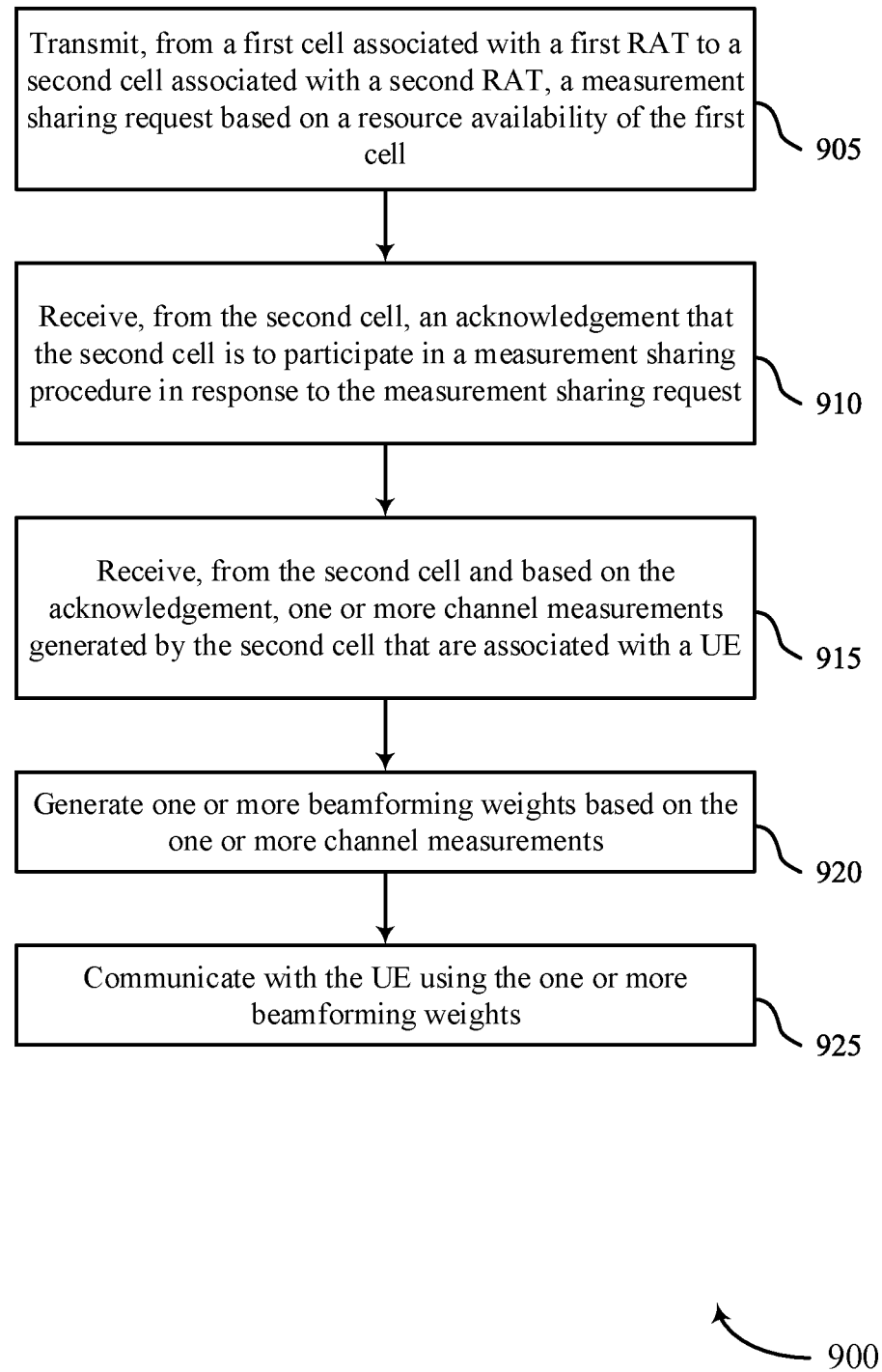

FIG. 9 shows a flowchart illustrating a method 900 that supports Node B measurement sharing in accordance with aspects of the present disclosure. The operations of the method 900 may be implemented by a first cell (e.g., a base station) or its components as described herein. For example, the operations of the method 900 may be performed by a base station 105 as described with reference to FIGS. 1 through 7. In some examples, the first cell may execute a set of instructions to control the functional elements of the first cell to perform the described functions. Additionally or alternatively, the first cell may perform aspects of the described functions using special-purpose hardware.

At 905, the method may include transmitting, from a first cell associated with a first RAT and to a second cell associated with a second RAT, a measurement sharing request based on a resource availability of the first cell. The operations of 905 may be performed in accordance with examples as disclosed herein. In some examples, aspects of the operations of 905 may be performed by a request transmitting component 625 as described with reference to FIG. 6.

At 910, the method may include receiving, from the second cell, an acknowledgement that the second cell is to participate in a measurement sharing procedure in response to the measurement sharing request. The operations of 910 may be performed in accordance with examples as disclosed herein. In some examples, aspects of the operations of 910 may be performed by an acknowledgement receiving component 630 as described with reference to FIG. 6.

At 915, the method may include receiving, from the second cell and based on the acknowledgement, one or more channel measurements generated by the second cell that are associated with a UE. The operations of 915 may be performed in accordance with examples as disclosed herein. In some examples, aspects of the operations of 915 may be performed by a measurement receiving component 635 as described with reference to FIG. 6.

At 920, the method may include generating one or more beamforming weights based on the one or more channel measurements. The operations of 920 may be performed in accordance with examples as disclosed herein. In some examples, aspects of the operations of 920 may be performed by a beamforming weight component 660 as described with reference to FIG. 6.

At 925, the method may include communicating with the UE using the one or more beamforming weights. The operations of 925 may be performed in accordance with examples as disclosed herein. In some examples, aspects of the operations of 925 may be performed by a communicating component 665 as described with reference to FIG. 6.

Figure 10:
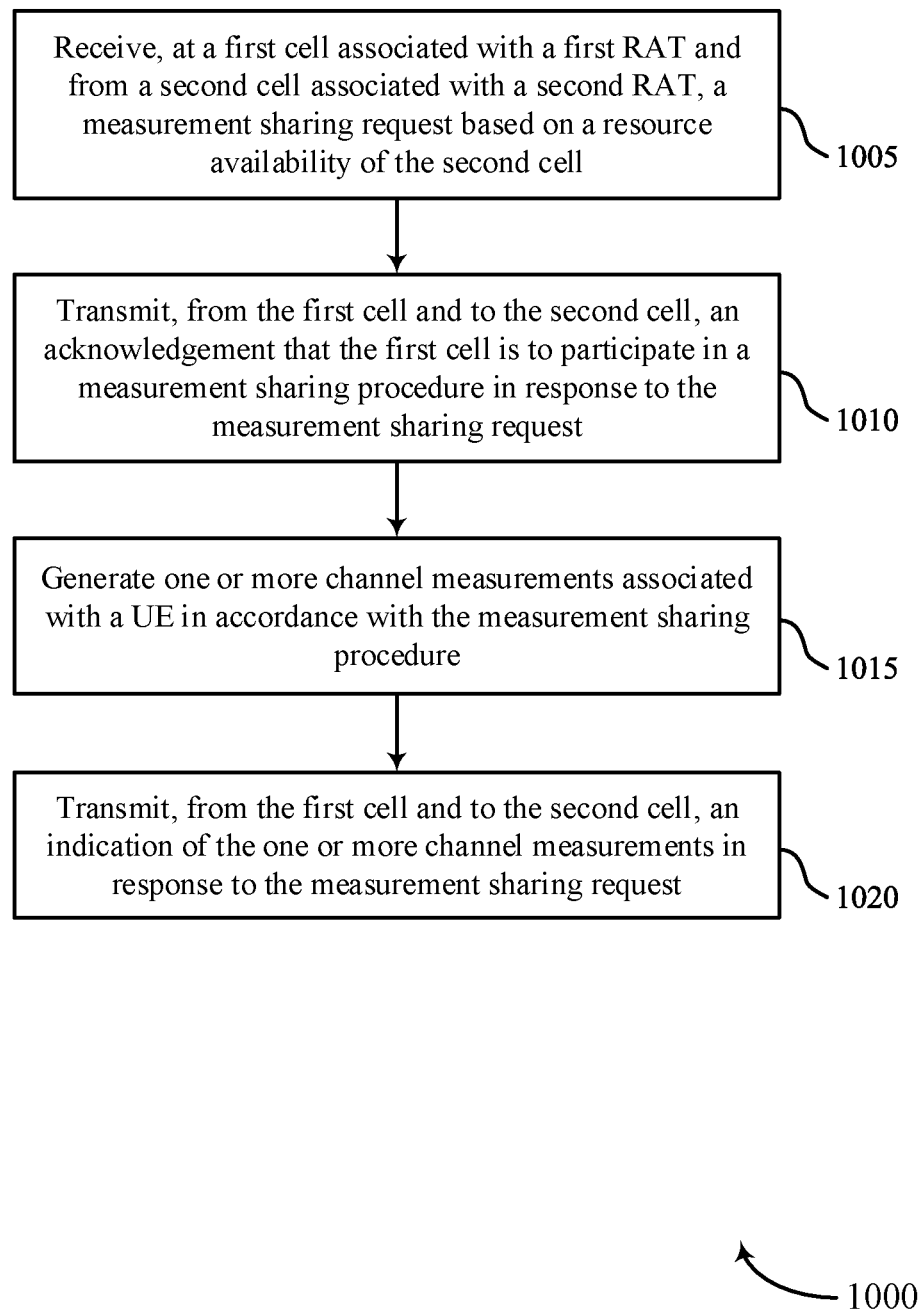

FIG. 10 shows a flowchart illustrating a method 1000 that supports Node B measurement sharing in accordance with aspects of the present disclosure. The operations of the method 1000 may be implemented by a first cell (e.g., a base station) or its components as described herein. For example, the operations of the method 1000 may be performed by a base station 105 as described with reference to FIGS. 1 through 7. In some examples, the first cell may execute a set of instructions to control the functional elements of the first cell to perform the described functions. Additionally or alternatively, the first cell may perform aspects of the described functions using special-purpose hardware.

At 1005, the method may include receiving, at a first cell associated with a first RAT and from a second cell associated with a second RAT, a measurement sharing request based on a resource availability of the second cell. The operations of 1005 may be performed in accordance with examples as disclosed herein. In some examples, aspects of the operations of 1005 may be performed by a request reception component 640 as described with reference to FIG. 6.

At 1010, the method may include transmitting, from the first cell and to the second cell, an acknowledgement that the first cell is to participate in a measurement sharing procedure in response to the measurement sharing request. The operations of 1010 may be performed in accordance with examples as disclosed herein. In some examples, aspects of the operations of 1010 may be performed by an acknowledgement transmission component 645 as described with reference to FIG. 6.

At 1015, the method may include generating one or more channel measurements associated with a UE in accordance with the measurement sharing procedure. The operations of 1015 may be performed in accordance with examples as disclosed herein. In some examples, aspects of the operations of 1015 may be performed by a measurement generation component 650 as described with reference to FIG. 6.

At 1020, the method may include transmitting, from the first cell and to the second cell, an indication of the one or more channel measurements in response to the measurement sharing request. The operations of 1020 may be performed in accordance with examples as disclosed herein. In some examples, aspects of the operations of 1020 may be performed by a measurement transmission component 655 as described with reference to FIG. 6.

Figure 11:
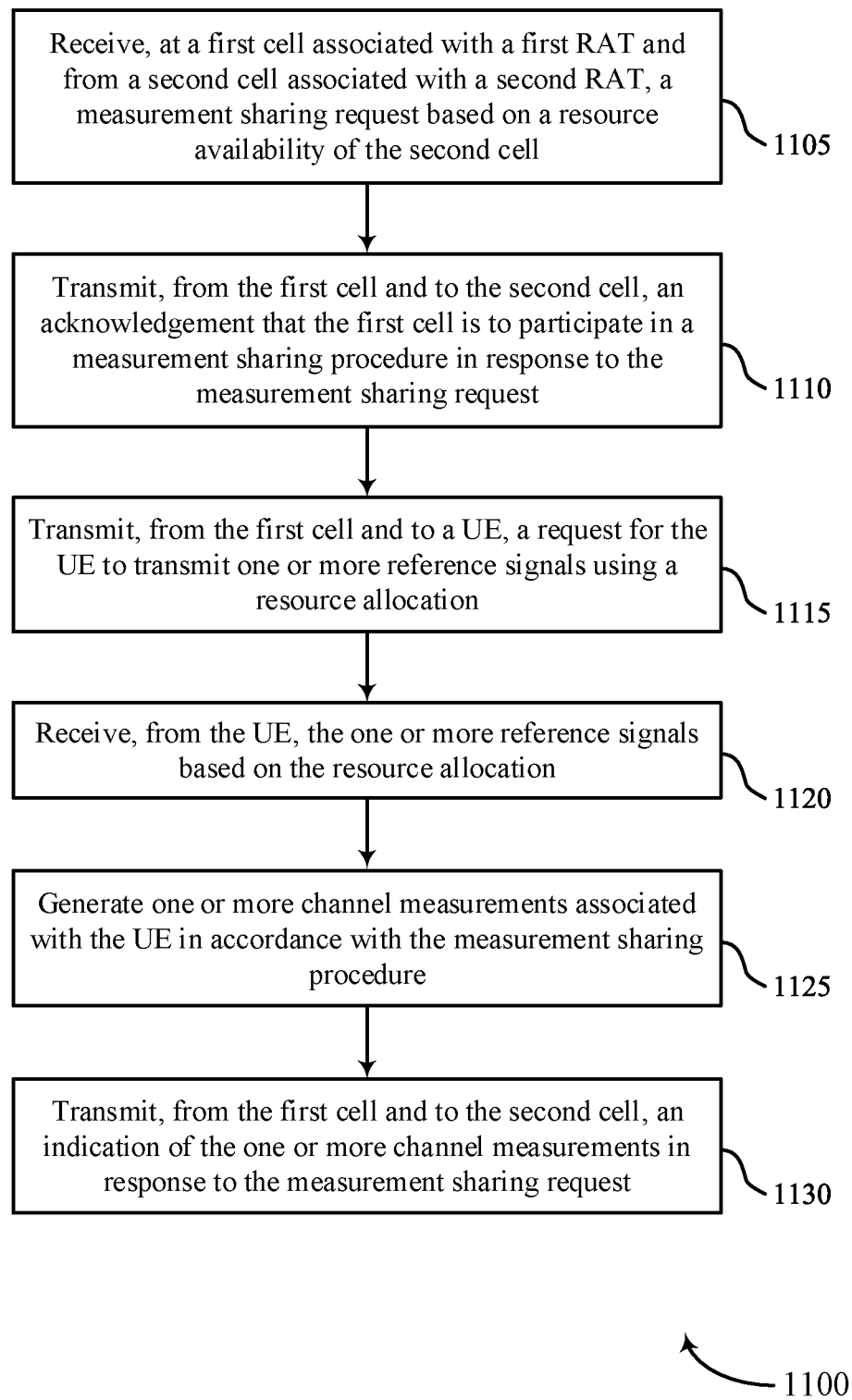

FIG. 11 shows a flowchart illustrating a method 1100 that supports Node B measurement sharing in accordance with aspects of the present disclosure. The operations of the method 1100 may be implemented by a first cell (e.g., a base station) or its components as described herein. For example, the operations of the method 1100 may be performed by a base station 105 as described with reference to FIGS. 1 through 7. In some examples, the first cell may execute a set of instructions to control the functional elements of the first cell to perform the described functions. Additionally or alternatively, the first cell may perform aspects of the described functions using special-purpose hardware.

At 1105, the method may include receiving, at a first cell associated with a first RAT and from a second cell associated with a second RAT, a measurement sharing request based on a resource availability of the second cell. The operations of 1105 may be performed in accordance with examples as disclosed herein. In some examples, aspects of the operations of 1105 may be performed by a request reception component 640 as described with reference to FIG. 6.

At 1110, the method may include transmitting, from the first cell and to the second cell, an acknowledgement that the first cell is to participate in a measurement sharing procedure in response to the measurement sharing request. The operations of 1110 may be performed in accordance with examples as disclosed herein. In some examples, aspects of the operations of 1110 may be performed by an acknowledgement transmission component 645 as described with reference to FIG. 6.

At 1115, the method may include transmitting, from the first cell and to a UE, a request for the UE to transmit one or more reference signals using a resource allocation. The operations of 1115 may be performed in accordance with examples as disclosed herein. In some examples, aspects of the operations of 1115 may be performed by a resource allocation component 675 as described with reference to FIG. 6.

At 1120, the method may include receiving, from the UE, the one or more reference signals based on the resource allocation. The operations of 1120 may be performed in accordance with examples as disclosed herein. In some examples, aspects of the operations of 1120 may be performed by a reference signal component 680 as described with reference to FIG. 6.

At 1125, the method may include generating one or more channel measurements associated with the UE in accordance with the measurement sharing procedure. The operations of 1125 may be performed in accordance with examples as disclosed herein. In some examples, aspects of the operations of 1125 may be performed by a measurement generation component 650 as described with reference to FIG. 6.

At 1130, the method may include transmitting, from the first cell and to the second cell, an indication of the one or more channel measurements in response to the measurement sharing request. The operations of 1130 may be performed in accordance with examples as disclosed herein. In some examples, aspects of the operations of 1130 may be performed by a measurement transmission component 655 as described with reference to FIG. 6.

The following provides an overview of aspects of the present disclosure:

Aspect 1: A method for wireless communications at a first cell associated with a first radio access technology, comprising: transmitting, from the first cell and to a second cell associated with a second radio access technology, a measurement sharing request based at least in part on a resource availability of the first cell; receiving, from the second cell, an acknowledgement that the second cell is to participate in a measurement sharing procedure in response to the measurement sharing request; and receiving, from the second cell and based at least in part on the acknowledgement, one or more channel measurements generated by the second cell that are associated with a UE.

Aspect 2: The method of aspect 1, further comprising: generating one or more beamforming weights based at least in part on the one or more channel measurements; and communicating with the UE using the one or more beamforming weights.

Aspect 3: The method of any of aspects 1 through 2, wherein receiving the one or more channel measurements from the second cell comprises: receiving, from the second cell, a message indicating an angle of arrival or a direction of arrival associated with one or more reference signals transmitted by the UE, a speed of the UE, or a combination thereof.

Aspect 4: The method of any of aspects 1 through 3, wherein receiving the one or more channel measurements from the second cell comprises: receiving, from the second cell, a message indicating a channel response, a received power, a received signal to interference plus noise ratio, an interference plus noise value, or a combination thereof associated with one or more reference signals transmitted by the UE.

Aspect 5: The method of any of aspects 1 through 4, wherein the first radio access technology is a new radio (NR) radio access technology and the second radio access technology is a long term evolution (LTE) radio access technology.

Aspect 6: The method of any of aspects 1 through 5, wherein the second radio access technology is different from the first radio access technology.

Aspect 7: The method of any of aspects 1 through 5, wherein the second radio access technology is the same as the first radio access technology.

Aspect 8: The method of any of aspects 1 through 7, wherein transmitting the measurement sharing request is further based at least in part on the first cell and the second cell having overlapping coverage areas.

Aspect 9: The method of any of aspects 1 through 8, wherein transmitting the measurement sharing request is further based at least in part on the UE being in a connected state with the first cell and the second cell.

Aspect 10: The method of any of aspects 1 through 8, wherein transmitting the measurement sharing request is further based at least in part on the UE being in a connected state with the first cell and the UE being in an idle state with the second cell.

Aspect 11: The method of any of aspects 1 through 10, wherein transmitting the measurement sharing request is further based at least in part on the first cell and the second cell operating in the same radio frequency spectrum band.

Aspect 12: The method of any of aspects 1 through 11, further comprising: scheduling one or more subsequent communications with the UE based at least in part on the one or more channel measurements.

Aspect 13: A method for wireless communications at a first cell associated with a first radio access technology, comprising: receiving, from a second cell associated with a second radio access technology, a measurement sharing request based at least in part on a resource availability of the first cell; transmitting, from the first cell and to the second cell, an acknowledgement that the first cell is to participate in a measurement sharing procedure in response to the measurement sharing request; generating one or more channel measurements associated with a UE in accordance with the measurement sharing procedure; transmitting, from the first cell and to the second cell, an indication of the one or more channel measurements in response to the measurement sharing request.

Aspect 14: The method of aspect 13, further comprising: transmitting, from the first cell and to the UE, a request for the UE to transmit one or more reference signals using a resource allocation; and receiving, from the UE, the one or more reference signals based at least in part on the resource allocation.

Aspect 15: The method of aspect 14, wherein generating the one or more channel measurements comprises: generating the one or more channel measurements based at least in part on measuring the one or more reference signals.

Aspect 16: The method of aspect 15, wherein transmitting the indication of the one or more channel measurements comprises: transmitting, from the first cell and to the second cell, a message indicating an angle of arrival or a direction of arrival associated with the one or more reference signals, a speed of the UE, or a combination thereof.

Aspect 17: The method of any of aspects 15 through 16, wherein transmitting the indication of the one or more channel measurements comprises: transmitting, from the first cell and to the second cell, a message indicating a channel response, a received power, a received signal to interference plus noise ratio, an interference plus noise value, or a combination thereof associated with the one or more reference signals.

Aspect 18: The method of any of aspects 14 through 17, wherein receiving the one or more reference signals comprises: receiving, from the UE, one or more sounding reference signals based at least in part on the resource allocation.

Aspect 19: The method of any of aspects 14 through 18, wherein receiving the one or more reference signals comprises: receiving, from the UE, one or more demodulation reference signals or phase tracking reference signals based at least in part on the resource allocation.

Aspect 20: The method of any of aspects 14 through 19, wherein transmitting the request comprises: transmitting, from the first cell and to the UE, a request for the UE to transmit the one or more reference signals using a physical resource block range, a sounding reference signal slot offset, a sounding reference signal symbol offset, a sounding reference signal periodicity, or a combination thereof.

Aspect 21: The method of any of aspects 14 through 20, wherein transmitting the request comprises: transmitting, from the first cell and to the UE, a radio resource control reconfiguration message that indicates the request.

Aspect 22: The method of any of aspects 13 through 21, wherein the first radio access technology is an LTE radio access technology and the second radio access technology is an NR radio access technology.

Aspect 23: The method of any of aspects 13 through 22, wherein the second radio access technology is different from the first radio access technology.

Aspect 24: The method of any of aspects 13 through 22, wherein the second radio access technology is the same as the first radio access technology.

Aspect 25: The method of any of aspects 13 through 24, wherein receiving the measurement sharing request is further based at least in part on the first cell and the second cell having overlapping coverage areas.

Aspect 26: The method of any of aspects 13 through 25, wherein receiving the measurement sharing request is further based at least in part on the UE being in a connected state with the first cell and the second cell.

Aspect 27: The method of any of aspects 13 through 25, wherein receiving the measurement sharing request is further based at least in part on the UE being in a connected state with the second cell and the UE being in an idle state with the first cell.

Aspect 28: The method of any of aspects 13 through 27, wherein receiving the measurement sharing request is further based at least in part on the first cell and the second cell operating in the same radio frequency spectrum band.

Aspect 29: An apparatus for wireless communications at a first cell associated with a first radio access technology, comprising a processor; memory coupled with the processor; and instructions stored in the memory and executable by the processor to cause the apparatus to perform a method of any of aspects 1 through 12.

Aspect 30: An apparatus for wireless communications at a first cell associated with a first radio access technology, comprising at least one means for performing a method of any of aspects 1 through 12.

Aspect 31: A non-transitory computer-readable medium storing code for wireless communications at a first cell associated with a first radio access technology, the code comprising instructions executable by a processor to perform a method of any of aspects 1 through 12.

Aspect 32: An apparatus for wireless communications at a first cell associated with a first radio access technology, comprising a processor; memory coupled with the processor; and instructions stored in the memory and executable by the processor to cause the apparatus to perform a method of any of aspects 13 through 28.

Aspect 33: An apparatus for wireless communications at a first cell associated with a first radio access technology, comprising at least one means for performing a method of any of aspects 13 through 28.

Aspect 34: A non-transitory computer-readable medium storing code for wireless communications at a first cell associated with a first radio access technology, the code comprising instructions executable by a processor to perform a method of any of aspects 13 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first cell associated with a first radio access technology, comprising:
   transmitting, from the first cell and to a second cell associated with a second radio access technology, a measurement sharing request based at least in part on a resource availability of the first cell;
   receiving, from the second cell, an acknowledgement that the second cell is to participate in a measurement sharing procedure in response to the measurement sharing request; and
   receiving, from the second cell and based at least in part on the acknowledgement, one or more channel measurements generated by the second cell that are associated with a user equipment (UE).

2. The method of claim 1, further comprising:
   generating one or more beamforming weights based at least in part on the one or more channel measurements; and
   communicating with the UE using the one or more beamforming weights.

3. The method of claim 1, wherein receiving the one or more channel measurements from the second cell comprises:
   receiving, from the second cell, a message indicating an angle of arrival or a direction of arrival associated with one or more reference signals transmitted by the UE, a speed of the UE, or a combination thereof.

4. The method of claim 1, wherein receiving the one or more channel measurements from the second cell comprises:
   receiving, from the second cell, a message indicating a channel response, a received power, a received signal to interference plus noise ratio, an interference plus noise value, or a combination thereof associated with one or more reference signals transmitted by the UE.

5. The method of claim 1, wherein the first radio access technology is a New Radio (NR) radio access technology and the second radio access technology is a Long Term Evolution (LTE) radio access technology.

6. The method of claim 1, wherein the second radio access technology is different from the first radio access technology.

7. The method of claim 1, wherein the second radio access technology is the same as the first radio access technology.

8. The method of claim 1, wherein transmitting the measurement sharing request is further based at least in part on the first cell and the second cell having overlapping coverage areas.

9. The method of claim 1, wherein transmitting the measurement sharing request is further based at least in part on the UE being in a connected state with the first cell and the second cell.

10. The method of claim 1, wherein transmitting the measurement sharing request is further based at least in part on the UE being in a connected state with the first cell and the UE being in an idle state with the second cell.

11. The method of claim 1, wherein transmitting the measurement sharing request is further based at least in part on the first cell and the second cell operating in the same radio frequency spectrum band.

12. The method of claim 1, further comprising:
scheduling one or more subsequent communications with the UE based at least in part on the one or more channel measurements.

13. A method for wireless communications at a first cell associated with a first radio access technology, comprising:
receiving, from a second cell associated with a second radio access technology, a measurement sharing request based at least in part on a resource availability of the second cell;
transmitting, from the first cell and to the second cell, an acknowledgement that the first cell is to participate in a measurement sharing procedure in response to the measurement sharing request;
generating one or more channel measurements associated with a user equipment (UE) in accordance with the measurement sharing procedure;
transmitting, from the first cell and to the second cell, an indication of the one or more channel measurements in response to the measurement sharing request.

14. The method of claim 13, further comprising:
transmitting, from the first cell and to the UE, a request for the UE to transmit one or more reference signals using a resource allocation; and
receiving, from the UE, the one or more reference signals based at least in part on the resource allocation.

15. The method of claim 14, wherein generating the one or more channel measurements comprises:
generating the one or more channel measurements based at least in part on measuring the one or more reference signals.

16. The method of claim 15, wherein transmitting the indication of the one or more channel measurements comprises:
transmitting, from the first cell and to the second cell, a message indicating an angle of arrival or a direction of arrival associated with the one or more reference signals, a speed of the UE, or a combination thereof.

17. The method of claim 15, wherein transmitting the indication of the one or more channel measurements comprises:
transmitting, from the first cell and to the second cell, a message indicating a channel response, a received power, a received signal to interference plus noise ratio, an interference plus noise value, or a combination thereof associated with the one or more reference signals.

18. The method of claim 14, wherein receiving the one or more reference signals comprises:
receiving, from the UE, one or more sounding reference signals based at least in part on the resource allocation.

19. The method of claim 14, wherein receiving the one or more reference signals comprises:
receiving, from the UE, one or more demodulation reference signals or phase tracking reference signals based at least in part on the resource allocation.

20. The method of claim 14, wherein transmitting the request comprises:
transmitting, from the first cell and to the UE, a request for the ULE to transmit the one or more reference signals using a physical resource block range, a sounding reference signal slot offset, a sounding reference signal symbol offset, a sounding reference signal periodicity, or a combination thereof.

21. The method of claim 14, wherein transmitting the request comprises:
transmitting, from the first cell and to the UE, a radio resource control reconfiguration message that indicates the request.

22. The method of claim 13, wherein the first radio access technology is a Long Term Evolution (LTE) radio access technology and the second radio access technology is a New Radio (NR) radio access technology.

23. The method of claim 13, wherein the second radio access technology is different from the first radio access technology.

24. The method of claim 13, wherein the second radio access technology is the same as the first radio access technology.

25. The method of claim 13, wherein receiving the measurement sharing request is further based at least in part on the first cell and the second cell having overlapping coverage areas.

26. The method of claim 13, wherein receiving the measurement sharing request is further based at least in part on the UE being in a connected state with the first cell and the second cell.

27. The method of claim 13, wherein receiving the measurement sharing request is further based at least in part on the UE being in a connected state with the second cell and the UE being in an idle state with the first cell.

28. The method of claim 13, wherein receiving the measurement sharing request is further based at least in part on the first cell and the second cell operating in the same radio frequency spectrum band.

29. An apparatus for wireless communications, comprising:
a processor;
memory coupled with the processor; and
instructions stored in the memory and executable by the processor to cause the apparatus to:
transmit, from a first cell associated with a first radio access technology to a second cell associated with a second radio access technology, a measurement sharing request based at least in part on a resource availability of the first cell;
receive, from the second cell, an acknowledgement that the second cell is to participate in a measurement sharing procedure in response to the measurement sharing request; and
receive, from the second cell and based at least in part on the acknowledgement, one or more channel measurements generated by the second cell that are associated with a user equipment (UE).

30. An apparatus for wireless communications, comprising:
a processor;
memory coupled with the processor; and
instructions stored in the memory and executable by the processor to cause the apparatus to:
receive, at a first cell associated with a first radio access technology and from a second cell associated with a second radio access technology, a measurement sharing request based at least in part on a resource availability of the second cell;
transmit, from the first cell and to the second cell, an acknowledgement that the first cell is to participate in a measurement sharing procedure in response to the measurement sharing request;
generate one or more channel measurements associated with a user equipment (UE) in accordance with the measurement sharing procedure;

transmit, from the first cell and to the second cell, an indication of the one or more channel measurements in response to the measurement sharing request.

\* \* \* \* \*